United States Patent
Watanabe et al.

(10) Patent No.: US 8,787,413 B2
(45) Date of Patent: *Jul. 22, 2014

(54) TEMPERATURE CONTROLLER FOR GAS LASER

(71) Applicant: Gigaphoton Inc., Oyama (JP)

(72) Inventors: Yukio Watanabe, Utsunomiya (JP); Hideyuki Hayashi, Hiratsuka (JP); Kouji Kakizaki, Hiratsuka (JP); Michio Shinozaki, Chikusei (JP); Hideo Hoshino, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,819

(22) Filed: Jul. 8, 2013

(65) Prior Publication Data

US 2013/0294470 A1     Nov. 7, 2013

Related U.S. Application Data

(62) Division of application No. 13/543,510, filed on Jul. 6, 2012, now Pat. No. 8,498,317, which is a division of application No. 12/710,722, filed on Feb. 23, 2010, now Pat. No. 8,238,392.

(30) Foreign Application Priority Data

Feb. 23, 2009   (JP) .................................. 2009-039568
Feb. 23, 2009   (JP) .................................. 2009-039569
Feb. 19, 2010   (JP) .................................. 2010-035305

(51) Int. Cl.
*H01S 3/04*     (2006.01)

(52) U.S. Cl.
USPC .............................................. 372/35; 372/34

(58) Field of Classification Search
USPC .............................................. 372/34, 35, 55
See application file for complete search history.

(56) References Cited

U.S. PATENT DOCUMENTS 7,257,136 B2    8/2007  Mori et al.
8,238,392 B2 *  8/2012  Watanabe et al. ............... 372/35

FOREIGN PATENT DOCUMENTS

| JP | 4-075392 A | 3/1992 |
| JP | 7-227688 A | 8/1995 |
| JP | 9-083044 A | 3/1997 |
| JP | 2001-244537 A | 9/2001 |
| JP | 2006-024855 A | 1/2006 |
| JP | 2006-135298 A | 5/2006 |
| JP | 2007-266234 A | 10/2007 |

OTHER PUBLICATIONS

Japanese Office Action, w/ English translation thereof, issued in Japanese Patent Application No. JP 2010-035305 dated Sep. 3, 2013.

* cited by examiner

*Primary Examiner* — Armando Rodriguez
(74) *Attorney, Agent, or Firm* — McDermott Will & Emery LLP

(57) ABSTRACT

A temperature controller for a gas laser which controls temperatures of a plurality of temperature-controlled apparatuses including a first temperature-controlled portion requiring a high-precision temperature-control and a second temperature-controlled portion requiring a low-precision temperature-control as compared with the first temperature-controlled portion and allowing a temperature-control with a low or high temperature as compared with the first temperature-controlled portion, comprises a first temperature control portion generating a cooling agent or a heating agent for adjusting a temperature of each first temperature-controlled portion, a second temperature control portion generating a cooling agent or a heating agent for adjusting a temperature of each second temperature-controlled portion, a first piping system connecting the first temperature control portion and each first temperature-controlled portion in parallel, and a second piping system connecting the second temperature control portion and each second temperature-controlled portion in parallel.

3 Claims, 20 Drawing Sheets

TEMPERATURE CONTROLLER FOR GAS LASER

CROSS-REFERENCE TO RELATED APPLICATIONS

This application is divisional of U.S. application Ser. No. 13/543,510 filed on Jul. 6, 2012, which is a divisional of U.S. application Ser. No. 12/710,722, filed on Feb. 23, 2010, now U.S. Pat. No. 8,238,392, and claims the benefit of priority from the prior Japanese Patent Applications No. 2009-039568, filed on Feb. 23, 2009, No. 2009-039569, filed on Feb. 23, 2009, and No. 2010-035305, filed on Feb. 19, 2010; the entire contents of which are incorporated herein by reference.

BACKGROUND OF THE DISCLOSURE

1. Field of the Disclosure

The present disclosure relates to a temperature controller for a gas laser.

2. Description of the Related Art

In recent years, along with a progress in miniaturization of semiconductor device, miniaturization of transcription pattern used in photolithography in a semiconductor process has developed rapidly. In the next generation, microfabrication to the extent of 70 nm to 45 nm, or even to the extent of 32 nm and beyond will be required. Therefore, in order to comply with the demand of microfabrication to the extent of 32 nm and beyond, development of such exposure apparatus combining an extreme ultraviolet (EUV) light source for a wavelength of about 13 nm and a reduced projection reflective optics is expected.

As the EUV light source, there are three possible types, which are a laser produced plasma (LPP) light source using plasma generated by irradiating a target with a laser beam, a discharge produced plasma (DPP) light source using plasma generated by electrical discharge, and a synchrotron radiation (SR) light source using orbital radiant light. Among these light sources, the LPP light source has such advantages that luminance can be made extremely high as close to the black-body radiation because plasma density can be made higher compared with the DPP light source and the SR light source. Among these light sources, the LPP light source has such advantages that luminance can be made extremely high as close to the black-body radiation because plasma density can be made higher compared with the DPP light source and the SR light source. Furthermore, the LPP light source has such advantages that there is no construction such as electrode around a light source because the light source is a point light source with nearly isotropic angular distributions, and therefore extremely wide collecting solid angle can be acquired, and so on. Accordingly, the LPP light source having such advantages is expected as a light source for EUV lithography which requires more than several dozen to several hundred watt power.

In the EUV light source apparatus with the LPP system, as disclosed by Japanese Patent Application Laid-Open No. 2007-266234, firstly, a target material supplied inside a vacuum chamber is excited by irradiation with a laser light and thus be turned into plasma. Then, a light with various wavelength components including an EUV light is emitted from the generated plasma. Then, the EUV light source apparatus focuses the EUV light on a predetermined point by reflecting the EUV light using an EUV collector mirror which selectively reflects an EUV light with a specific wavelength, e.g. a 13.5 nm wavelength component. The reflected EUV light is inputted to an exposure apparatus. On a reflective surface of the EUV collector mirror, a multilayer coating (Mo/Si multilayer coating) with a structure in that thin coating of molybdenum (Mo) and thin coating of silicon (Si) are alternately stacked, for instance, is formed. The multilayer coating exhibits a high reflectance ratio (of about 60% to 70%) with respect to the EUV light with a 13.5 nm wavelength.

Here, in Japanese Patent Application Laid-Open No. 2006-135298, a driver laser for an EUV light source apparatus with the LPP system which uses a $CO_2$ gas laser as a master oscillator (MO) and multistage-amplifies a laser light oscillated by the MO using the CO2 gas laser is disclosed.

BRIEF SUMMARY OF THE DISCLOSURE

In accordance with one aspect of the present disclosure, a temperature controller for a gas laser which controls temperatures of a plurality of temperature-controlled apparatuses including a first temperature-controlled portion requiring a high-precision temperature-control and a second temperature-controlled portion requiring a low-precision temperature-control as compared with the first temperature-controlled portion and allowing a temperature-control with a low or high temperature as compared with the first temperature-controlled portion, the temperature controller for a gas laser comprises: a first temperature control portion generating a cooling agent or a heating agent for adjusting a temperature of each first temperature-controlled portion; a second temperature control portion generating a cooling agent or a heating agent for adjusting a temperature of each second temperature-controlled portion; a first piping system connecting the first temperature control portion and each first temperature-controlled portion in parallel; and a second piping system connecting the second temperature control portion and each second temperature-controlled portion in parallel.

In accordance with one aspect of the present disclosure, a temperature controller for a gas laser which controls temperatures of a plurality of temperature-controlled apparatuses including a first temperature-controlled portion requiring a high-precision temperature-control and a second temperature-controlled portion requiring a low-precision temperature-control as compared with the first temperature-controlled portion and allowing a temperature-control with a low or high temperature as compared with the first temperature-controlled portion, the temperature controller for a gas laser comprises: a plurality of first temperature control portions each of which is arranged as corresponding to each first temperature-controlled portion and generates a cooling agent or a heating agent for adjusting at least each first temperature-controlled portion; a plurality of delivery piping systems connecting each first temperature control portion and each first temperature-controlled portion and delivering the cooling agent or the heating agent from each first temperature control portion; a plurality of return piping systems connecting each first temperature control portion and each second temperature-controlled portion and returning the cooling agent or the heating agent from each second temperature-controlled portion; and a plurality of connecting piping systems connecting each first temperature-controlled portion and each second temperature-controlled portion and delivering the cooling agent and the heating agent from the each first temperature-controlled portion to each second temperature control portion.

In accordance with one aspect of the present disclosure, a temperature controller for a gas laser comprises: a laser apparatus having a discharge portion to be filled up with a gaseous amplifiable agent, the discharge portion having a discharge electrode connected to a power supply unit; a pipe connected to the discharge portion; a heat exchanger cooling or heating cooling water to be supplied to the discharge portion via the pipe; an energy and/or power detector detecting energy and/or power of a laser light amplified by passing through the discharge portion; and a temperature control portion temperature-controlling the discharge portion using the cooling water based on a detection result by the energy and/or power detector.

These and other objects, features, aspects, and advantages of the present disclosure will become apparent to those skilled in the art from the following detailed description, which, taken in conjunction with the annexed drawings, discloses preferred embodiments of the present disclosure.

DESCRIPTION OF THE PREFERRED EMBODIMENTS

In the following, embodiments of a temperature controller for a gas laser for enforcing the present disclosure will be described in detail with reference to the accompanying drawings.

First Embodiment

Figure 2:
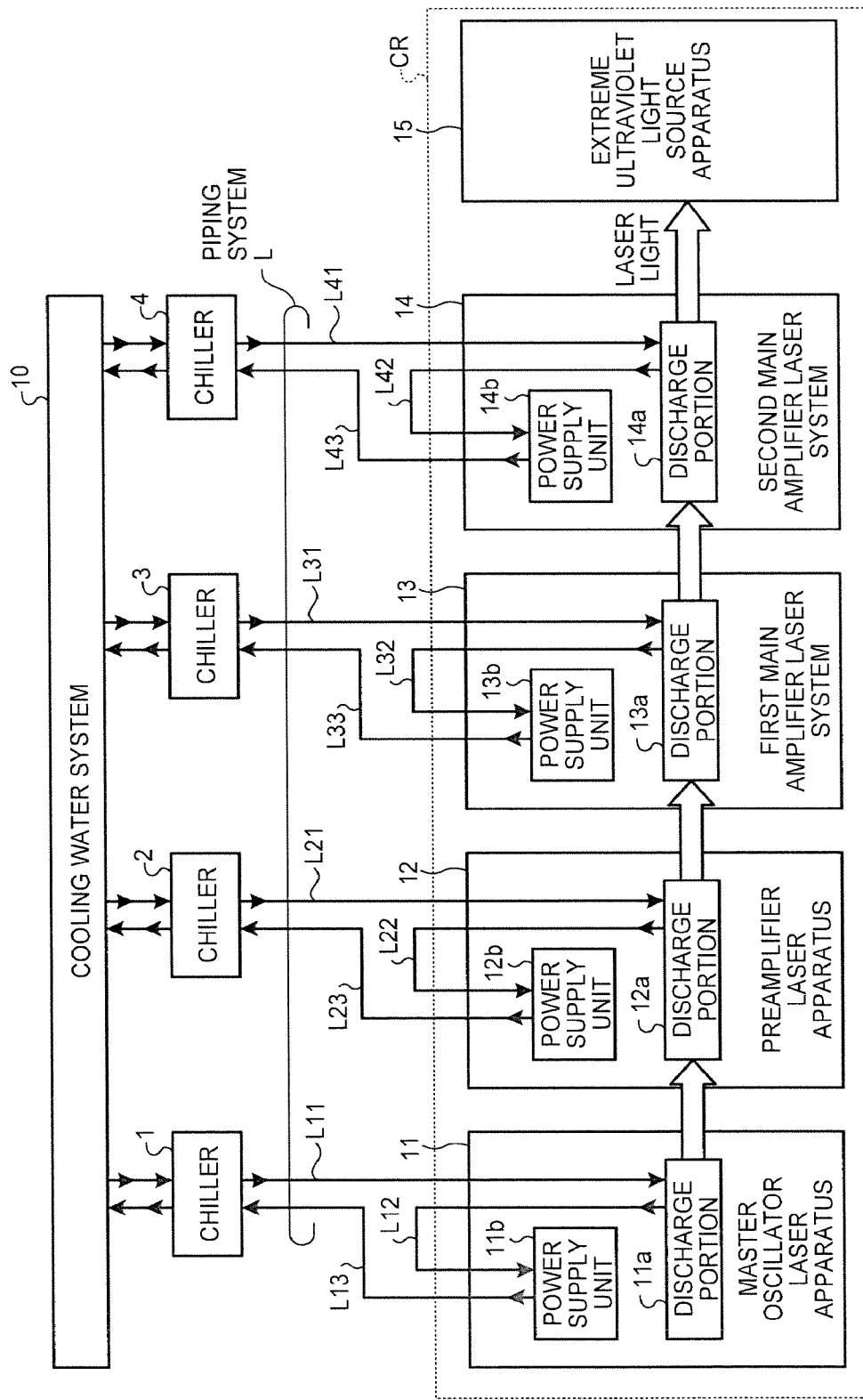
FIG. 2 is a schematic diagram showing a structure in that a temperature controller for a gas laser according to the first embodiment is applied to a driver laser of an extreme ultraviolet light source apparatus.

Firstly, FIG. 2 is a schematic diagram showing a structure in that a temperature controller for a gas laser according to a first embodiment of the present disclosure is applied to a driver laser of an extreme ultraviolet light source apparatus. As shown in FIG. 2, the driver laser has a master oscillator laser apparatus 11 being an MO, a pre-amplifier laser apparatus 12, a first main amplifier laser apparatus 13, and a second main amplifier laser apparatus 14. A seed laser with a wavelength of 10.6 μm having been outputted from the master oscillator laser apparatus 11 is sequentially amplified by passing through the preamplifier laser apparatus 12, the first main amplifier laser apparatus 13 and the second main amplifier laser apparatus 14 in that order. The amplified high power laser light is inputted to an extreme ultraviolet light source apparatus 15 generating an EUV light. Here, the master oscillator laser apparatus 11, the preamplifier 12, the first main amplifier laser apparatus 13 and the second main amplifier laser apparatus 14 may be arranged inside a clean room CR or outside but near the extreme ultraviolet light source apparatus 15 (downstairs, etc., for instance). The extreme ultraviolet light source apparatus 15 is arranged inside the clean room CR. Of course, an exposure apparatus (not shown) for exposure using an EUV light generated by the extreme ultraviolet light source apparatus 15 is arranged inside the clean room CR.

The master oscillator 11, the preamplifier laser apparatus 12, the first main amplifier laser apparatus 13 and the second main amplifier laser apparatus 14 have discharge portions 11a to 14a (11a, 12a, 13a, 14a) and power supply units 11b to 14b (11b, 12b, 13b, 14b), respectively. The discharge portions 11a to 14a have one or more elements requiring high-precision temperature control such as output mirrors. For instance, the output mirror requires temperature control to be within 26±0.5° C. On the other hand, the power supply units 11b to 14b do not require a high-precision temperature control range such as with the output mirrors, and allow a temperature range higher than the temperature control range of the output mirrors. For instance, the power supply units 11b to 14b is required to be temperature-controlled to be under a temperature of 35° C.

Figure 1:
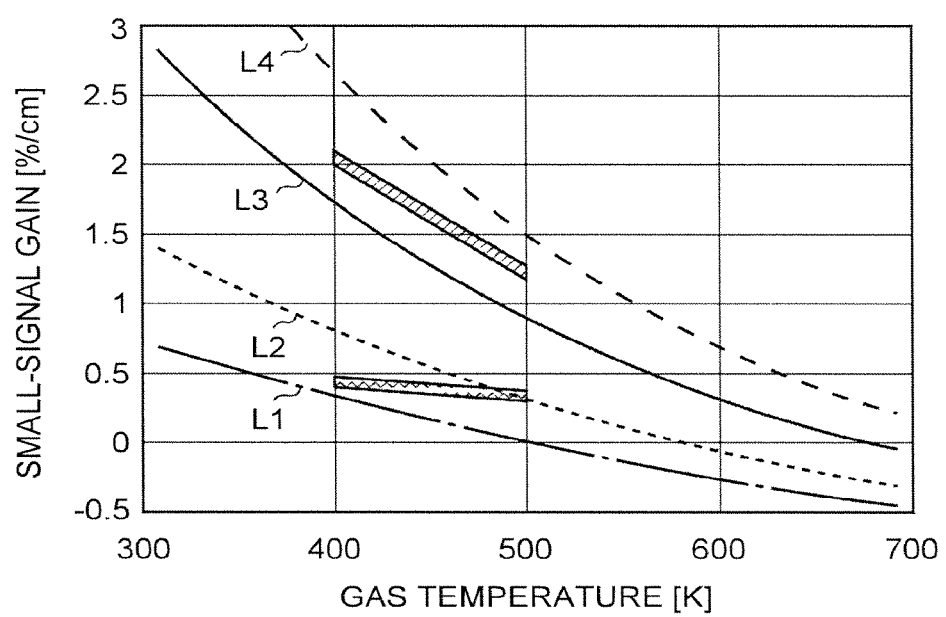
FIG. 1 is an illustration showing small-signal gains with respect to temperatures of a $CO_2$ gas used for an amplifiable agent of a gas laser apparatus in a first embodiment of the present disclosure.

FIG. 1 is an illustration showing small-signal gains with respect to temperatures of a $CO_2$ gas used as an amplifiable agent of a gas laser apparatus in the first embodiment of the present disclosure. In FIG. 1, lines L1 to L4 show small-signal gains with respect to gas temperatures in cases in that numbers of molecule $n_e$ per unit volume in the discharge portions are $0.5 \times 10^{16}$ m$^{-3}$, $1 \times 10^{16}$ m$^{-3}$, $2 \times 10^{16}$ m$^{-3}$, or $3 \times 10^{16}$ m$^{-3}$, respectively. As obvious from FIG. 1, the lower the temperature of $CO_2$ gas becomes, the larger the small-signal gain of each of the gas laser apparatuses 11 to 14 becomes. That is, by making the gas temperature be low by improving cooling capacities of chillers 1 to 4, it is possible to amplify a laser light to a desired energy and/or power even if electrical power supplied to the discharge portions 11a to 14a from the power supply units 11b to 14b may be decreased. Thereby, it is possible to realize energy saving in each of the gas laser apparatuses 11 to 14 and the extreme ultraviolet light source apparatus having those gas laser apparatuses 11 to 14.

In the first embodiment, the chillers 1 to 4 that generate cooling agents, e.g. cooling water, for temperature-control of each of the discharge portions 11a to 14a, are arranged as corresponding to the discharge portions 11a to 14a. The chillers 1 to 4 cool down the power supply units 11b to 14b by supplying temperature-controlled drain cooling water to the discharge portions 11a to 14a, respectively.

Each of the chillers 1 to 4 takes in cooling water from a cooling water system 10, which is located in an industrial plant and so on, for generating existing cooling water, and by a heat exchanger using this cooling water, generates cooling water for temperature-control of each of the discharge portions 11a to 14a. Between the chillers 1 to 4 and the discharge portions 11a to 14a, delivery pipes L11 to L41 for delivering the temperature-control cooling water to the discharge portions 11a to 14a are arranged, respectively. Between the discharge portions 11a to 14a and the power supply unit 11b to 14b, connecting pipes L12 to L42 for delivering the drain cooling water from the discharge portions 11a to 14a to the power supply units 11b to 14b are arranged, respectively. Between the power supply units 11b to 14b and the chillers 1 to 4, return pipes L13 to L43 (L13, L23, L33, L43) for returning the drain cooling water discharged from the power supply units 11b to 14b to the chillers 1 to 4 are arranged, respectively.

That is, the cooling water being cooled by the chillers 1 to 4 are delivered to the discharge portions 11a to 14a via the pipes L11 to L41 and used for high-precision temperature-control, respectively. The drain cooling water after being used for the temperature control has capacities to cool the power supply units 11b to 14b to a temperature of 35° C. under, respectively, for instance. In the first embodiment, the drain cooling water having passed through the respective discharge portions 11a to 14a is inputted to the power supply units 11b to 14b via the connecting pipes L12 to L42. Thereby, the power supply units 11b to 14b are temperature-controlled using the drain cooling water. After that, the drain cooling water having passed through the power supply portions 11b to 14b after being used for the temperature control returns to the chillers 1 to 4 via the return pipes L13 to L43, respectively. The chillers 1 to 4 cool down the returned drain cooling water again by the heat exchanger, respectively. Thereby, the drain cooling water is reused as cooling water for temperature-controlling the discharge portions 11a to 14b, respectively. In addition, the cooling water from the cooling water system 10 after being used for the heat exchangers in the chillers 1 to 4 will be returned to a side of the cooling water system 10.

In the first embodiment, the high-precision temperature control is executed by arranging individual cooling systems, such as chillers, only to the discharge portions 11a to 14a that require high-precision temperature-control while such individual cooling systems are not arranged for the discharge portions 11a to 14a and the power supply units 11b to 14b. In this arrangement, the power supply units 11b to 14b, which are capable of being cooled down with lower-precision using cooling water and higher temperature as compared to the discharge portions 11a to 14a, are cooled down using the drain cooling water after being used for the temperature-control. Therefore, it is possible to reduce the cooling capacities of the chillers, requiring a smaller number of chillers and a smaller number of pipes while energy saving can be enhanced, whereby it is possible to enhance downsizing of the apparatus.

Alternate Example of the First Embodiment

Figure 3:
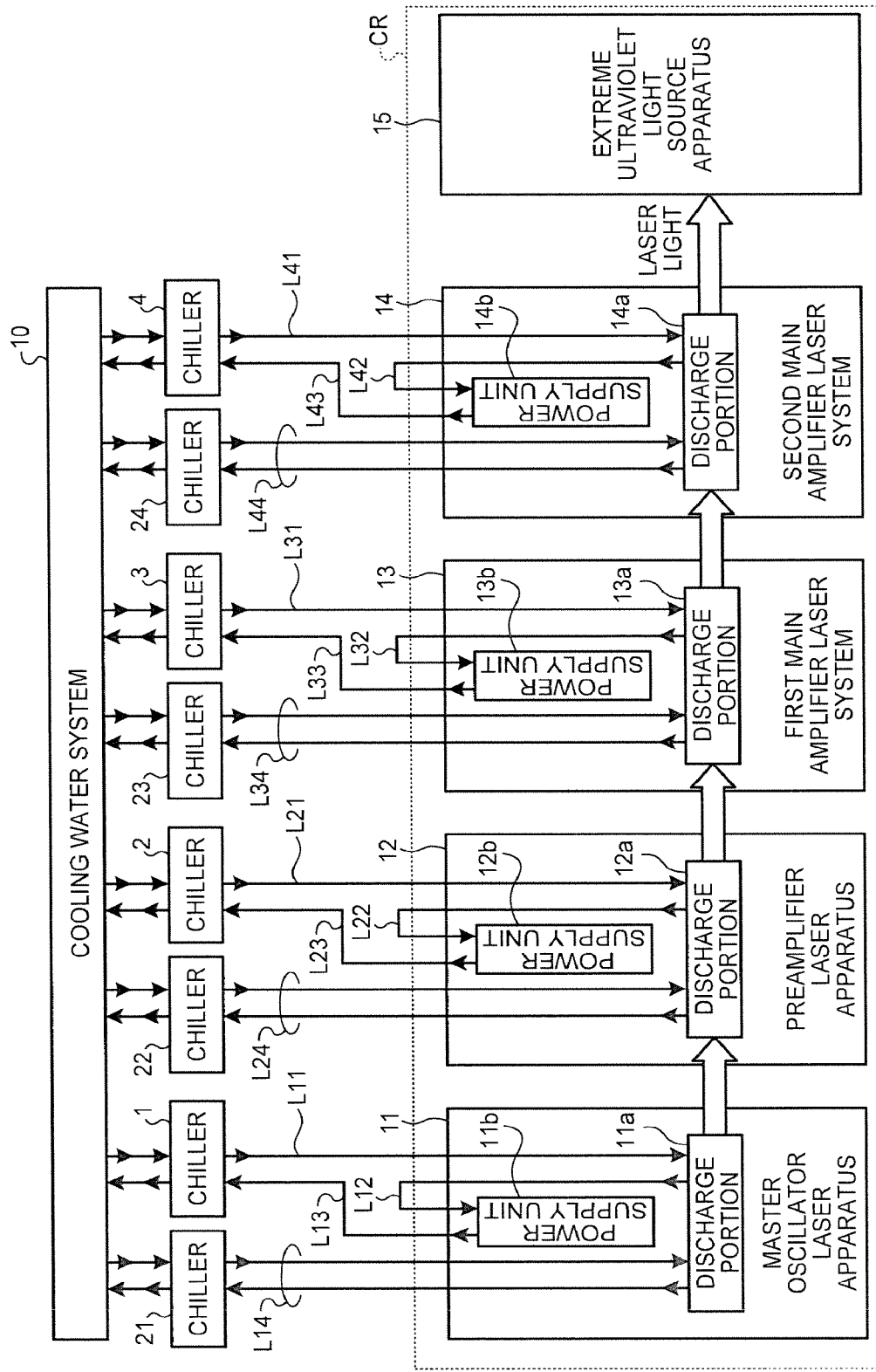
FIG. 3 is a schematic diagram showing a structure in that a temperature controller for a gas laser according to an alternate example of the first embodiment is applied to the driver laser of the extreme ultraviolet light source apparatus.

If there is a case in that the discharge portions 11a to 14a have temperature-controlled portions each of which requiring different precision from the other portions, e.g. the discharge portions 11a to 14a have optical elements each requiring temperature-control within 23±1° C. in addition to the output mirrors each requiring temperature-control within 26±0.5° C., for instance, chillers 21 to 24 and pipes L14 to L44 corresponding to discharge portions 11a to 14a are further arranged, as shown in FIG. 3. FIG. is a schematic diagram showing a structure in that a temperature controller for a gas laser according to the alternate example of the first embodiment is applied to the driver laser of the extreme ultraviolet light source apparatus. The discharge portions 11a to 14a are individually temperature-controlled with high precision using the chillers 21 to 41 which are individually arranged for the chillers 21 to 24. In addition, it is possible to use the drain cooling water after being used for the high-precision temperature-control in order to cool down the power supply units 11b to 14b in addition to the drain cooling water from the chillers 1 to 4, while it is also possible to use this cooling water after being used for the high-precision temperature-control alone in order to cool down the power supply units 11b to 14b.

Second Embodiment

Next, a temperature controller for a gas laser according to a second embodiment will be described in detail with reference to the accompanying drawings. In the above-described first embodiment, the drain cooling water of the discharge portions 11a to 14a is used in the power supply units 11b to 14b. On the other hand, in the second embodiment, a plurality of the power supply units 11b to 14b is temperature-controlled using a common chiller 31 while a plurality of discharge portions 11a to 14a is temperature-controlled using a common chiller 32.

Figure 4:
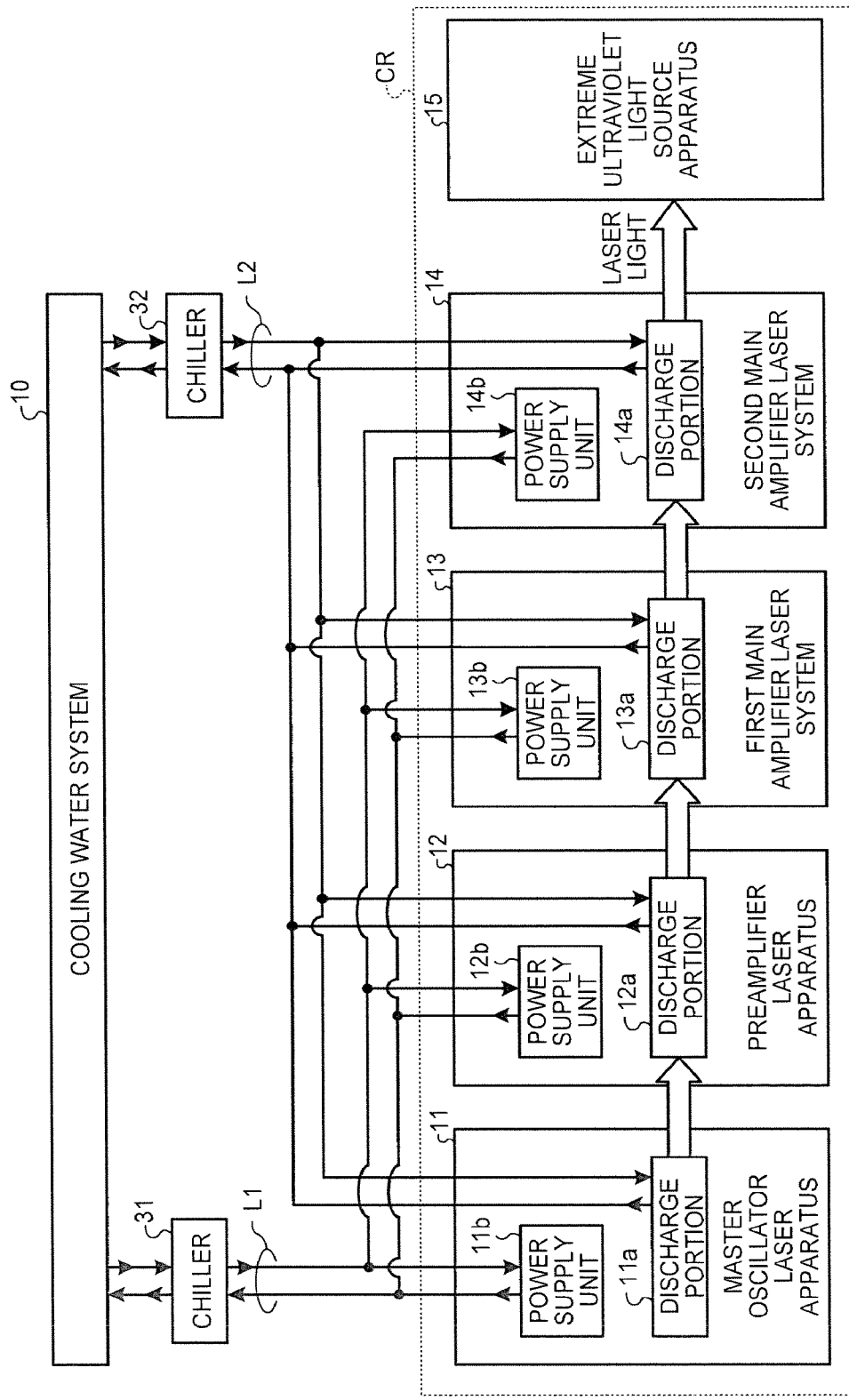
FIG. 4 is a schematic diagram showing a structure in that a temperature controller for a gas laser according to a second embodiment of the present disclosure is applied to a driver laser of an extreme ultraviolet light source apparatus.

FIG. 4 is a schematic diagram showing a structure in that a temperature controller for a gas laser according to the second embodiment of the present disclosure is applied to a driver laser of an extreme ultraviolet light source apparatus. As shown in FIG. 4, the chiller 32 and each of the discharge portions 11a to 14a are commonly connected by pipes L2. Thereby, a plurality of the discharge portions 11a to 14a is connected in parallel. Moreover, the chiller and each of the power supply units 11b to 14b are commonly connected by pipes L1. Thereby, a plurality of the power supply units 11b to 14b is connected in parallel.

In the second embodiment, because the chiller 31 or 32 is arranged with respect to each content of temperature-control for temperature-controlled portions, it may be good enough for each of the chillers 31 and 32 to have a cooling capacity that is necessary only for exhausting heat of the common temperature-controlled portions. By such structure, it is possible to execute efficient temperature-control, and as a result, it is possible to enhance the energy saving and the apparatus downsizing.

First Alternate Example of the Second Embodiment

Here, because the latter the amplifier stage becomes, the larger the laser output to be executed becomes, the discharge portion in the latter the amplifier stage among the discharge portions 11a to 14a requires larger cooling capacity. Therefore, there is a case in that the discharge portions with the same temperature-control ranges require different cooling capacities from one another. For instance, the discharge portion 13a requires a cooling capacity larger than a cooling capacity required by the discharge portion 12a.

Figure 5:
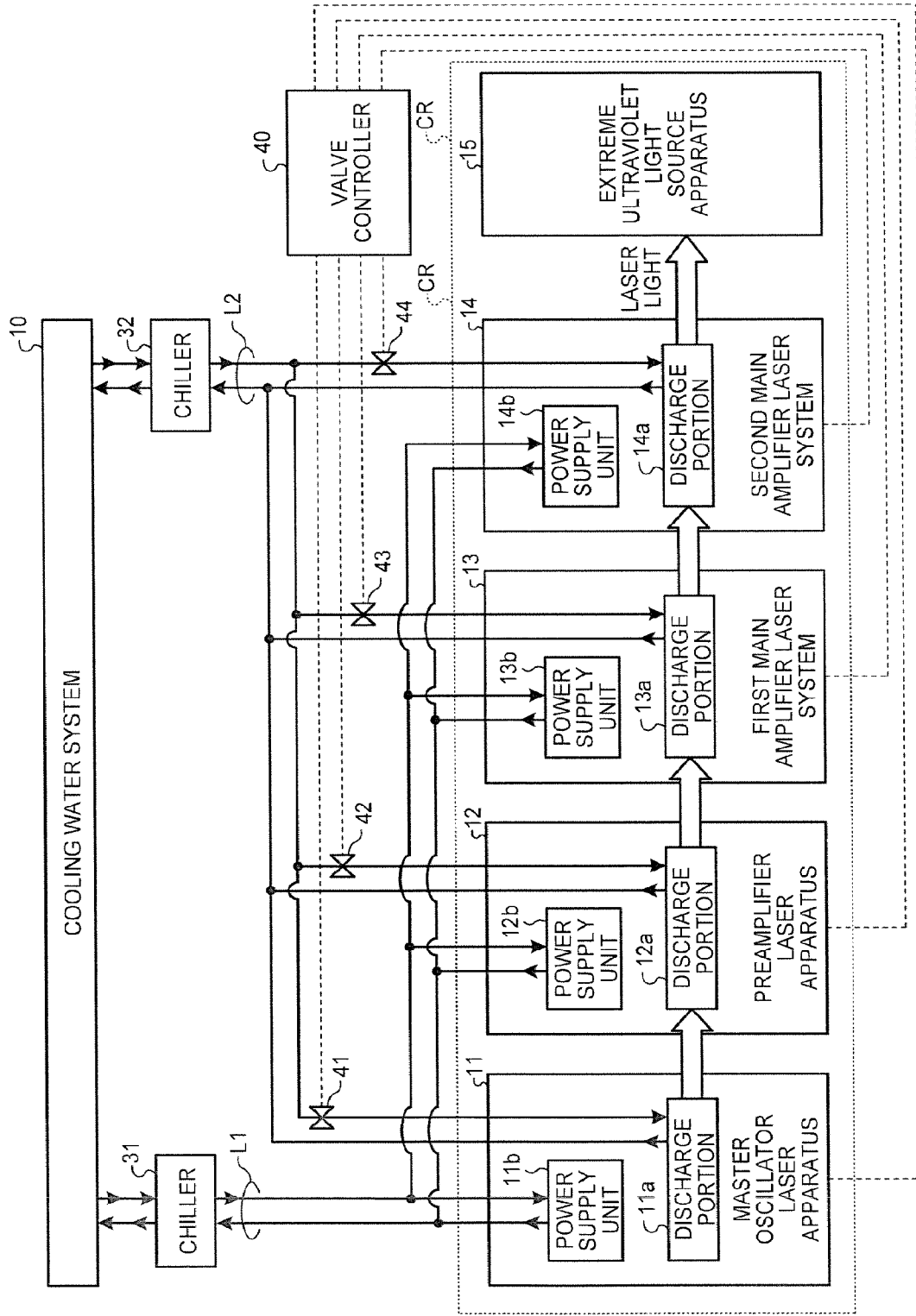
FIG. 5 is a schematic diagram showing a structure in that a temperature controller for a gas laser according to a first alternate example of the second embodiment is applied to the driver laser of the extreme ultraviolet light source apparatus.

In the first alternate example of the second embodiment, as shown in FIG. 5, control valves 41 to 44 for controlling flow rates of the cooling water to flow into the discharge portions 11a to 14a, respectively, are arranged. The cooling capacities of the discharge portions 11a to 14a become large, in the order of the discharge portion 11a, the discharge portion 12a, the discharge portion 13a and the discharge portion 14a. Sizes of apertures of the control valves 41 to 44 become large in order of the control valve 41, the control valve 42, the control valve 43 and the control valve 44. Thereby, even if cooling capacities of the discharge portions 11a to 14a are different from one another, it is possible to effectively cool down all of the discharge portions 11a to 14a using the single chiller 32. Furthermore, it is possible to reduce the cooling capacity of the chiller 32 as required for cooling down all of the discharge portions 11a to 14a.

As shown in FIG. 5, an aperture degree of each of the control valves 41 to 44 can be actively adjusted with respect to a temperature condition of each of the discharge portions 11a to 14a. In this case, it is possible to arrange such that a valve controller 40 detects the temperature condition of each of the discharge portions 11a to 14a, and executes a flow control by conducting a feedback control for adjusting the aperture degree of each of the control valves 11a to 14a based on the detected value.

Instead of the control valves 41 to 44, it is possible to connect pipes of which pipe diameters are different from one another to the discharge portions 11a to 14a. In this case, the pipe diameters with respect to the discharge portions 11a to 14a are set so as to become large in the order of the discharge portion 11a, the discharge portion 12a, the discharge portion 13a and the discharge portion 14a.

Furthermore, as shown in FIG. 5, as with the discharge portions 11a to 14a, it is possible to execute the temperature-control by commonly connecting the power supply units 11b to 14b to the single chiller 31 in a parallel-connected state. Also in this case, as with the discharge portions 11a to 14a described above, because required exhaust heat function for the power supply units 11b to 14b become larger as being in latter stages, it is possible to arrange control valves at the sides of the power supply units 11b to 14b or connect pipes with different pipe diameters to the power supply units 11b to 14b.

Second Alternate Example of the Second Embodiment

Figure 6:
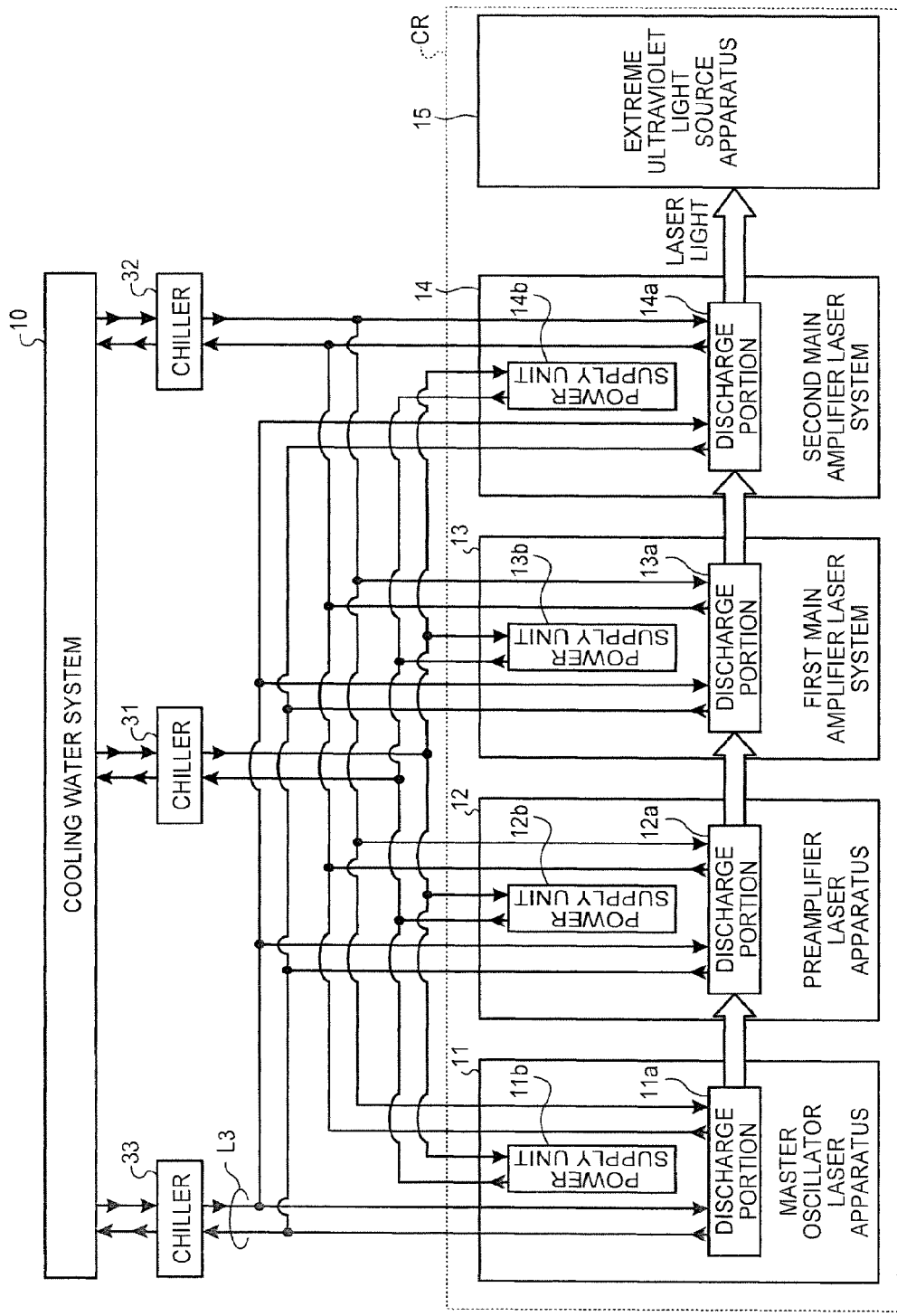
FIG. 6 is a schematic diagram showing a structure in that a temperature controller for a gas laser according to a second alternate example of the second embodiment is applied to the driver laser of the extreme ultraviolet light source apparatus.

FIG. 6 is a schematic diagram showing a structure in that a temperature controller for a gas laser according to a second alternate example of the second embodiment is applied to the driver laser of the extreme ultraviolet light source apparatus. As shown in FIG. 6, when there are portions requiring different high-precision temperature-control in the discharge portions 11a to 14a, a single chiller 33 and pipes L3 commonly connected with the high-precision temperature-controlled portions are newly arranged. By the pipes L3, the discharge portions 11a to 14a are connected in parallel. Thereby, it is possible to execute temperature-controls with respect to the high-precision temperature-control portions in the discharge portions 11a to 14a in a lump.

Third Alternate Example of the Second Embodiment

Figure 7:
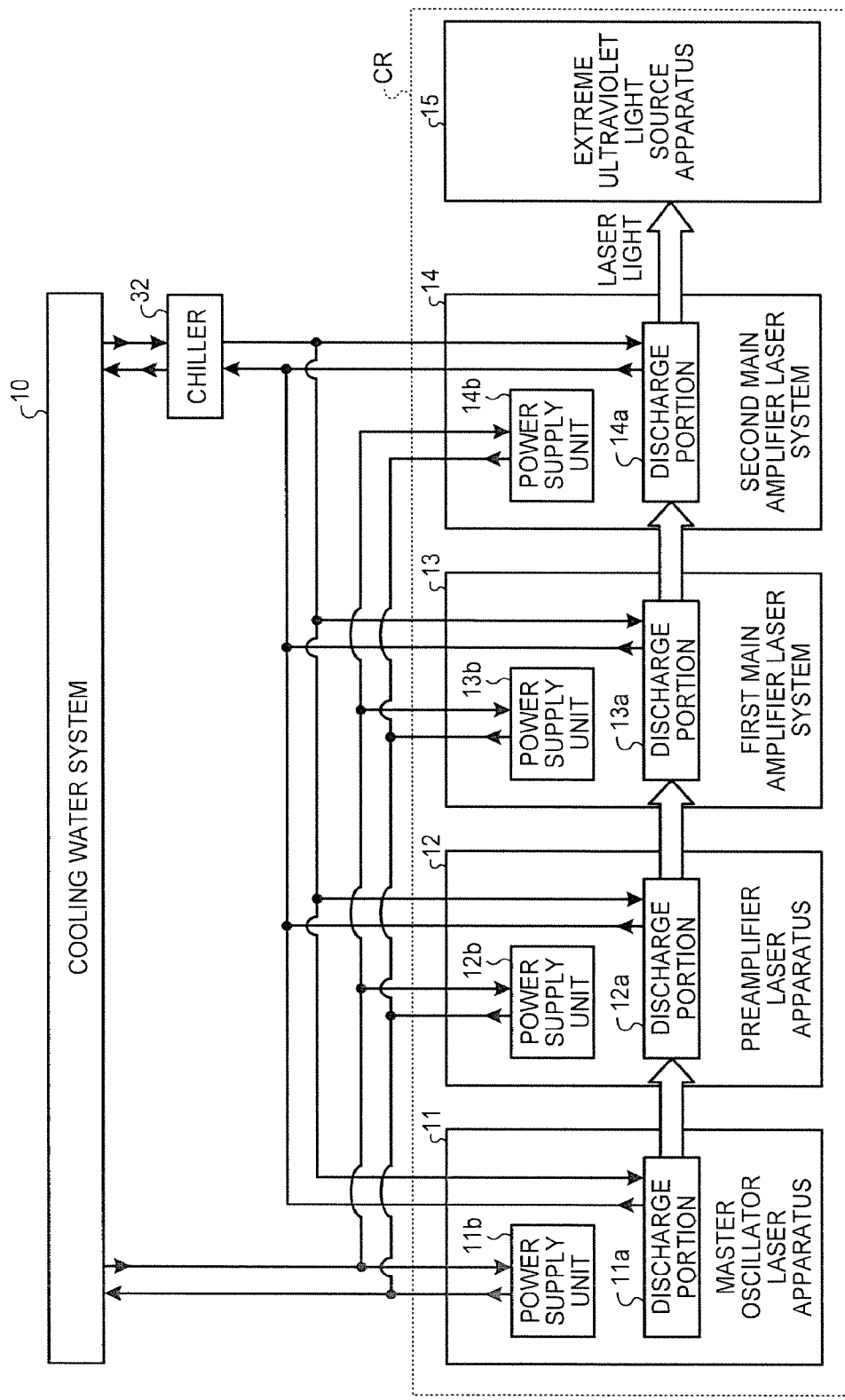
FIG. 7 is a schematic diagram showing a structure in that a temperature controller for a gas laser according to a third alternate example of the second embodiment is applied to the driver laser of the extreme ultraviolet light source apparatus.

Meanwhile, due to the temperature-control ranges of the above-described power supply units 11b to 14b being wide and upper limits of allowable temperatures being high as compared with the discharge portions 11a to 14a, the cooling water from the cooling water system 10 can be directly used for cooling down the power supply units 11b to 14b without arranging the chiller 31, as shown in FIG. 7. In this case also, the pipes are commonly connected to a plurality of the power supply units 11b to 14b. Thereby, a structure of the pipes may be downsized. FIG. 7 is a schematic diagram showing a structure in that a temperature controller for a gas laser according to the third alternate example of the second embodiment is applied to the driver laser of the extreme ultraviolet light source apparatus.

Fourth Alternate Example of the Second Embodiment

Figure 8:
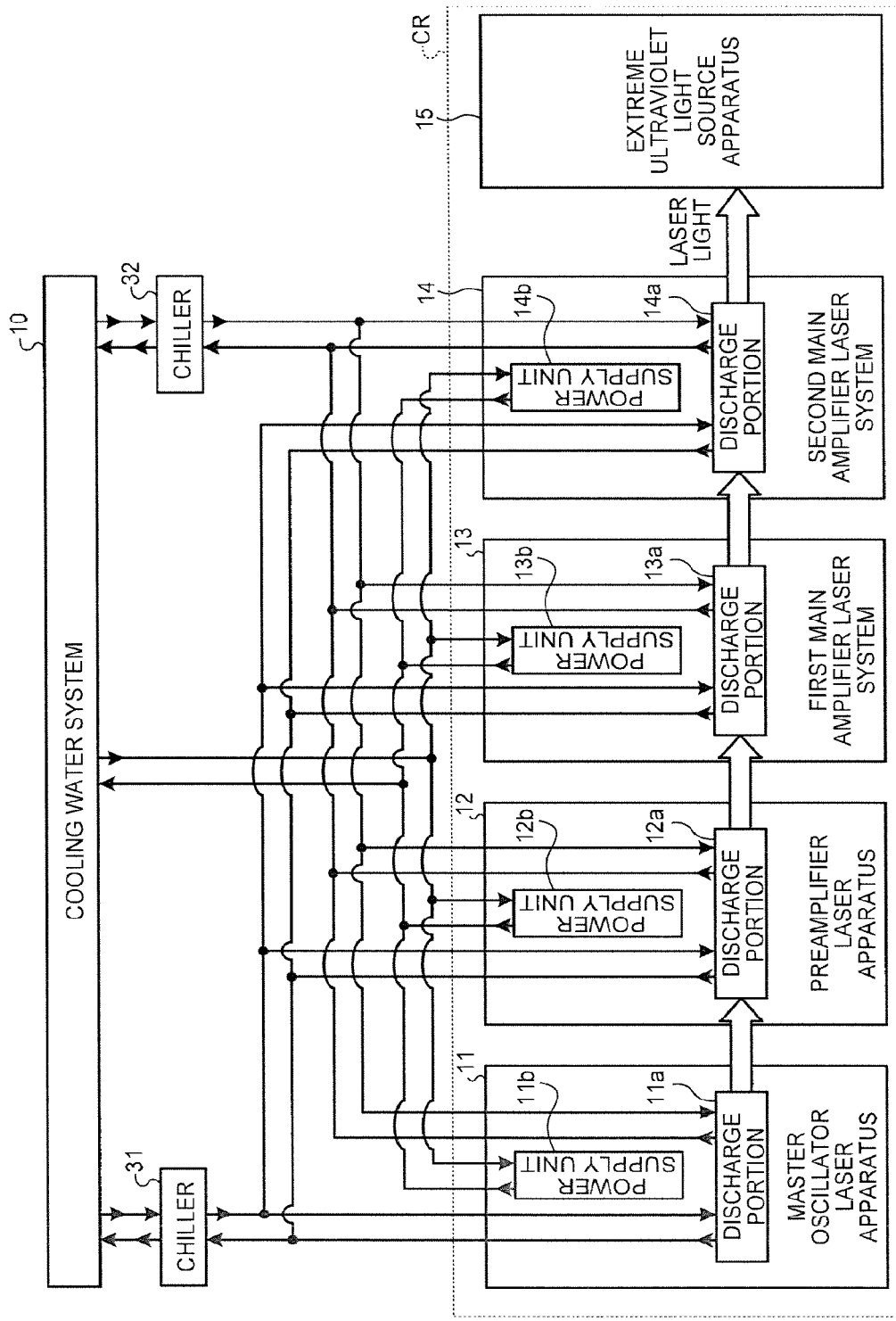
FIG. 8 is a schematic diagram showing a structure in that a temperature controller for a gas laser according to a fourth alternate example of the second embodiment is applied to the driver laser of the extreme ultraviolet light source apparatus.

The above-described temperature controller for a gas laser according to the third alternate example of the second embodiment has the structure in that the chiller 31 is removed from the structure of the temperature controller for a gas laser shown in FIG. 5. On the other hand, as shown in FIG. 8, a fourth alternate example of the second embodiment has a structure in that the chiller 33 is removed from the temperature controller for a gas laser shown in FIG. 6. By this structure also, it is possible to further enhance the energy saving and downsizing of the temperature controller for a gas laser. FIG. 8 is a schematic diagram showing the structure in that the temperature controller for a gas laser according to the fourth alternate example of the second embodiment is applied to the driver laser of the extreme ultraviolet light source apparatus.

Third Embodiment

Next, a temperature controller for a gas laser according to a third embodiment of the present disclosure will be described in detail with reference to the accompanying drawings. In the first embodiment described above, the drain cooling water from the discharge portions 11a to 14a are used for the power supply units 11b to 14b. On the other hand, in the third embodiment, the drain cooling water are used when the common connection as in the second embodiment is applied. By this arrangement, it is possible to realize further energy saving.

Figure 9:
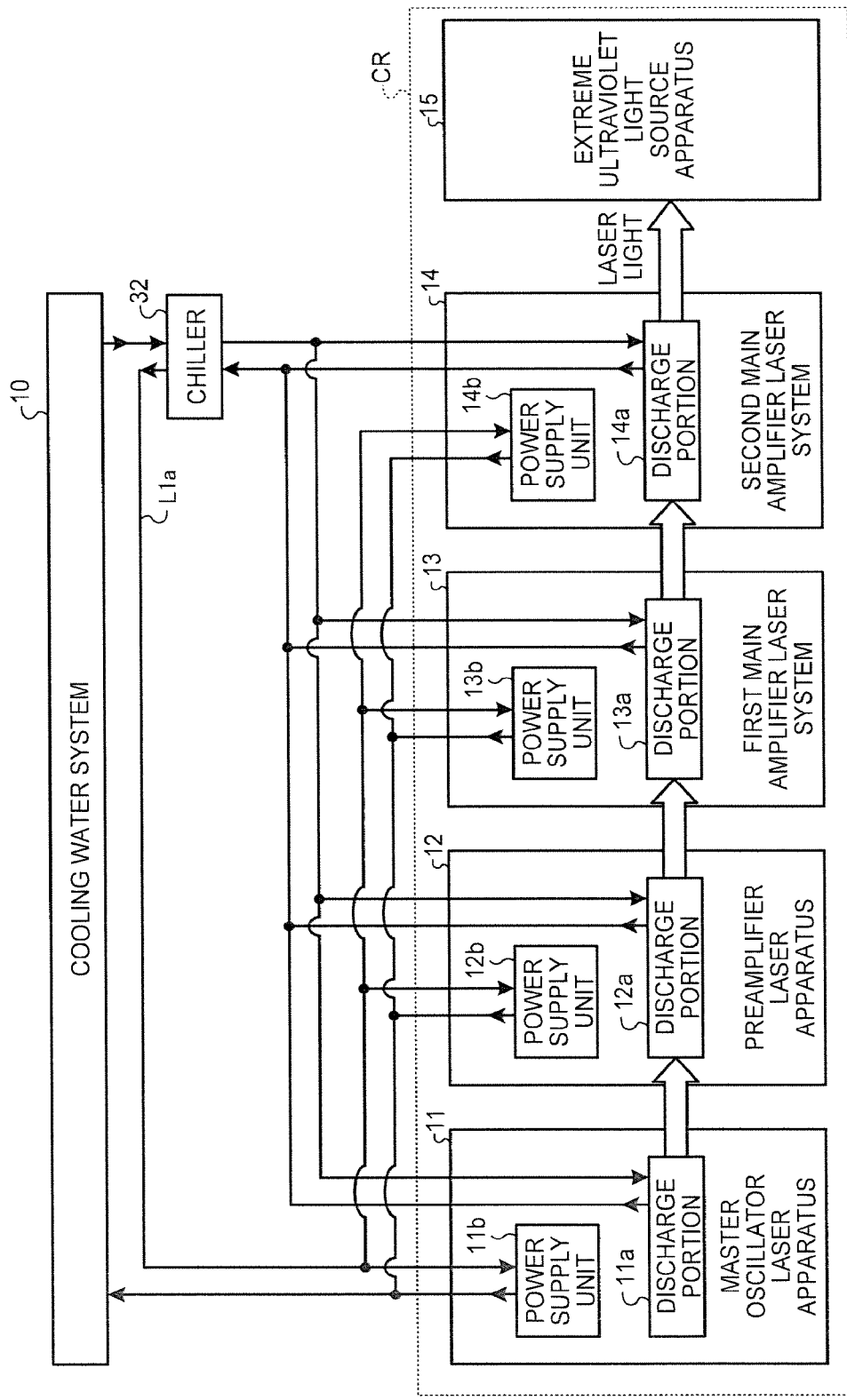
FIG. 9 is a schematic diagram showing a structure in that a temperature controller for a gas laser according to a third embodiment of the present disclosure is applied to a driver laser of an extreme ultraviolet light source apparatus.

FIG. 9 is a schematic diagram showing a structure in that a temperature controller for a gas laser according to the third embodiment of the present disclosure is applied to a driver laser of an extreme ultraviolet light source apparatus. As shown in FIG. 9, the chiller 32 and each of the discharge portions 11a to 14a are commonly connected in parallel. The drain cooling water from the respective discharge portions 11a to 14a are made to return to the chiller 32. Here, if a temperature of the cooling water supplied from the cooling system 10 is sufficiently low, even the drain cooling water after being used for the heat exchange in the chiller 32 will have a sufficient cooling capacity for cooling down the discharge portions 11b to 14b. In this respect, in the third embodiment, delivery pipes L1a commonly connected in parallel with the power supply units 11b to 14b from the chiller 32 are arranged. Each of the power supply units 11b to 14b is cooled down by the drain cooling water from the chiller 32 delivered via the delivery pipes L1a. The drain cooling water passing through the power supply units 11b to 14b is returned to a side of the cooling water system 10 by the return pipes commonly connected between each of the power supply units 11b to 14b and the cooling water system 10.

In the third embodiment, because the power supply units 11b to 14b are cooled down by reusing the drain cooling water from the chiller 32, it is possible to further enhance the energy saving. In addition, because it is not necessary to arrange a chiller for cooling down the power supply units 11b to 14b, it is also possible to enhance the apparatus downsizing. Especially, while the second alternate example of the second embodiment as shown in FIG. 7 in the case in that a water amount being to be supplied from the cooling water system 10 is a sum of a water amount required for cooling down the chiller 32 and a water amount required for cooling down each of the power supply units 11b to 14b, the third embodiment shown in FIG. 9 is a case in that only a water amount required for cooling down the chiller 32 is needed. Thereby, it is possible to enhance the energy saving.

Alternate Example of the Third Embodiment

Figure 10:
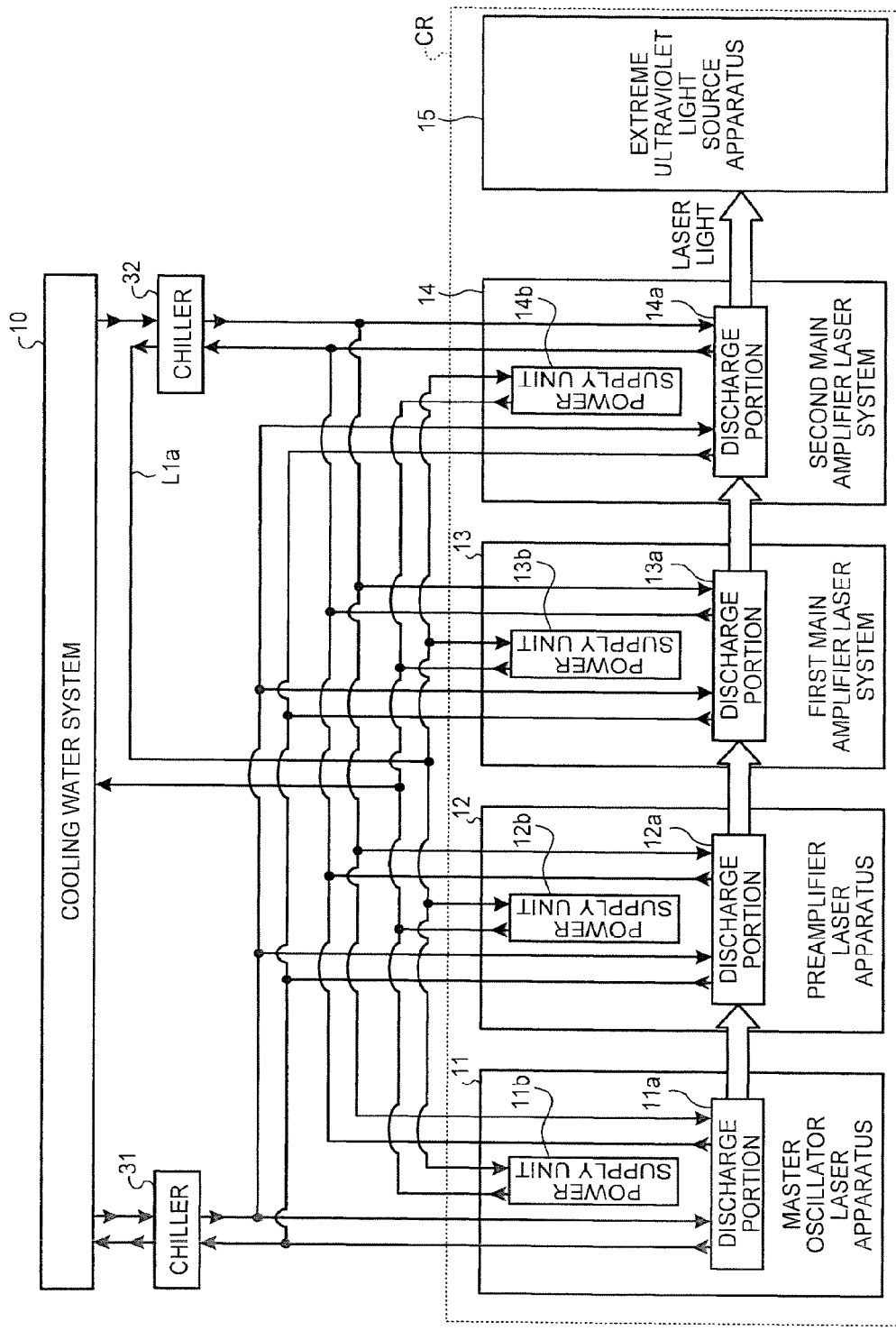
FIG. 10 is a schematic diagram showing a structure in that a temperature controller for a gas laser according to an alternate example of the third embodiment is applied to the driver laser of the extreme ultraviolet light source apparatus.

FIG. 10 is a schematic diagram showing a structure in that a temperature controller for a gas laser according to an alternate example of the third embodiment is applied to the driver laser of the extreme ultraviolet light source apparatus. As shown in FIG. 10, also in the structure corresponding to FIG. 8, the drain cooling water from the chiller 32 may be effectively used by using the delivery pipe L1a.

Fourth Embodiment

Next, a temperature controller for a gas laser according to a fourth embodiment of the present disclosure will be described in detail with reference to the accompanying drawings. In the fourth embodiment, in a structure in that a single chiller is connected to a plurality of discharge portions in parallel, as in the first embodiment, the drain cooling water from the discharge portions 11a to 14a is directly used for the power supply units 11b to 14b in the laser apparatus.

Figure 11:
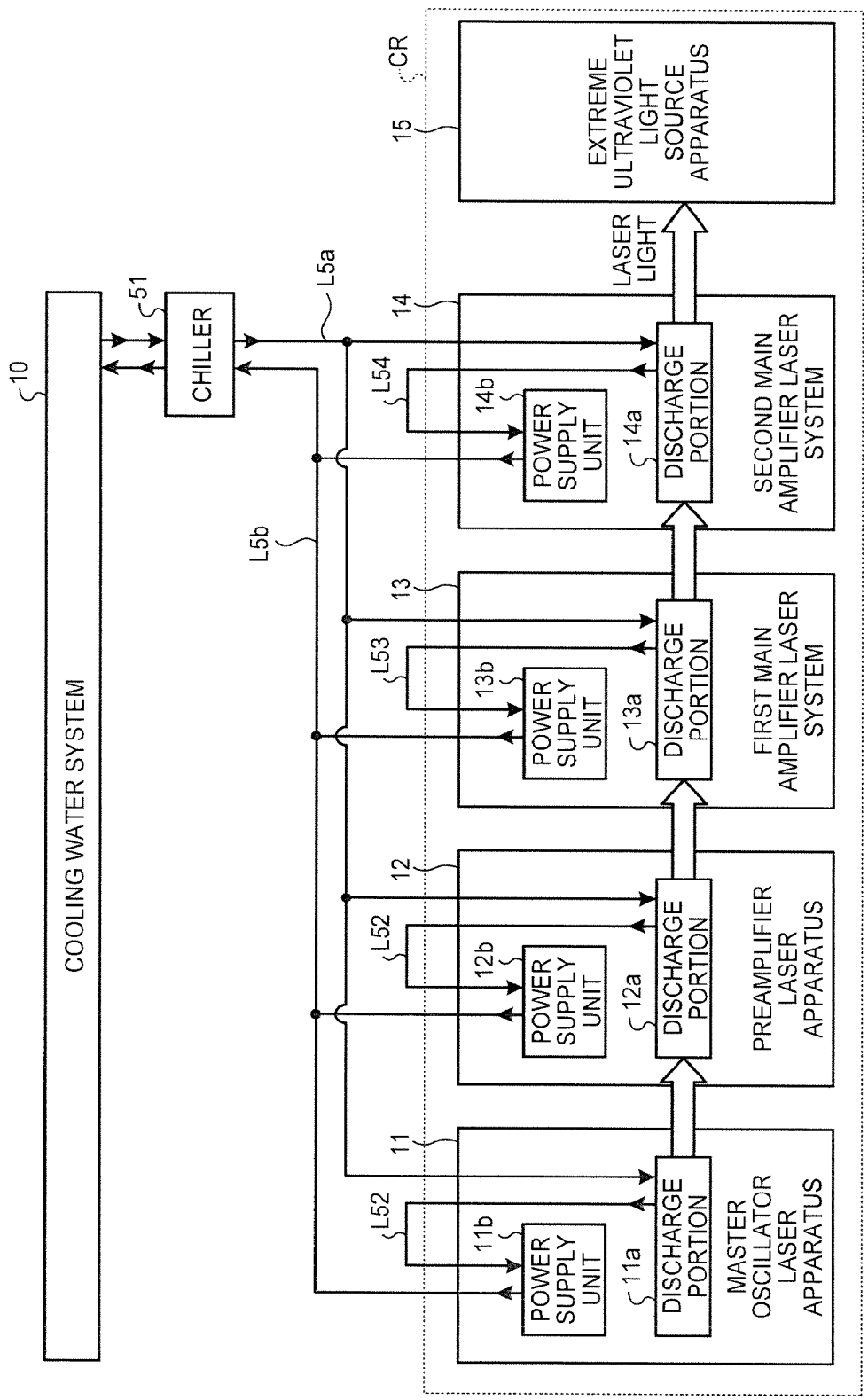
FIG. 11 is a schematic diagram showing a structure in that a temperature controller for a gas laser according to a fourth embodiment is applied to a driver laser of an extreme ultraviolet light source apparatus.

FIG. 11 is a schematic diagram showing a structure in that a temperature controller for a gas laser according to the fourth embodiment is applied to a driver laser of an extreme ultraviolet light source apparatus. As shown in FIG. 11, delivery pipes L5a from a chiller 51 to the discharge portions 11a to 14a are commonly connected in parallel. The drain cooling water from the discharge portions 11a to 14a is delivered to the sides of the power supply units 11b to 14b via connecting pipes L51 to L54 connecting between the discharge portions 11a to 14a and the power supply units 11b to 14b, respectively.

Furthermore, return pipes L5b from the power supply units 11b to 14b to the chiller 51 are commonly connected to the power supply units 11b to 14b in parallel, respectively.

As a result, as in the first embodiment, in each laser apparatus, the drain cooling water from the discharge portions 11a to 14a is used for the power supply units 11b to 14b. Furthermore, because the chiller 51 and each of the discharge portions 11a to 14a, and the chiller 51 and each of the power supply units 11b to 14b are connected in parallel, it is possible to realize the structure only using the single chiller 51. Accordingly, in the fourth embodiment, it is possible to enhance the energy saving and the apparatus downsizing.

Alternate Example of the Fourth Embodiment

Figure 12:
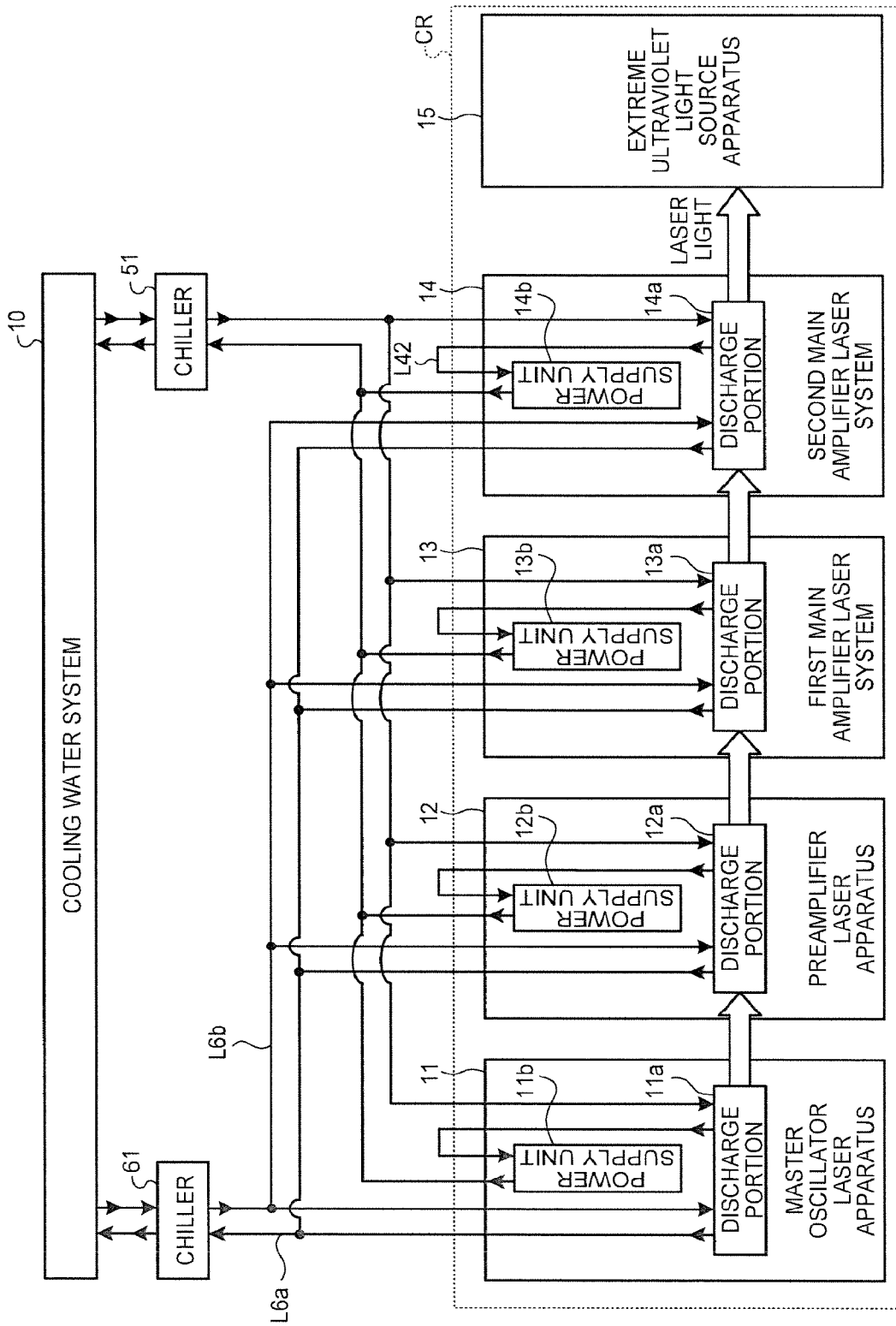
FIG. 12 is a schematic diagram showing a structure in that a temperature controller for a gas laser according to an alternate example of the fourth embodiment is applied to the driver laser of the extreme ultraviolet light source apparatus.

FIG. 12 is a schematic diagram showing a structure in that a temperature controller for a gas laser according to an alternate example of the fourth embodiment is applied to the driver laser of the extreme ultraviolet light source apparatus. As shown in FIG. 12, when the discharge portions 11a to 14a have different high-precision temperature-controlled portions, it is possible to execute effective temperature-control with respect to a plurality of the high-precision temperature-controlled portions by arranging pipes L6a and L6b commonly connecting the temperature-controlled portions, and a single chiller 61.

Fifth Embodiment

In the first to fourth embodiments described above, the chillers other than the cooling water system 10 are arranged. Here, the chiller can be built in the cooling water system 10.

Figure 13:
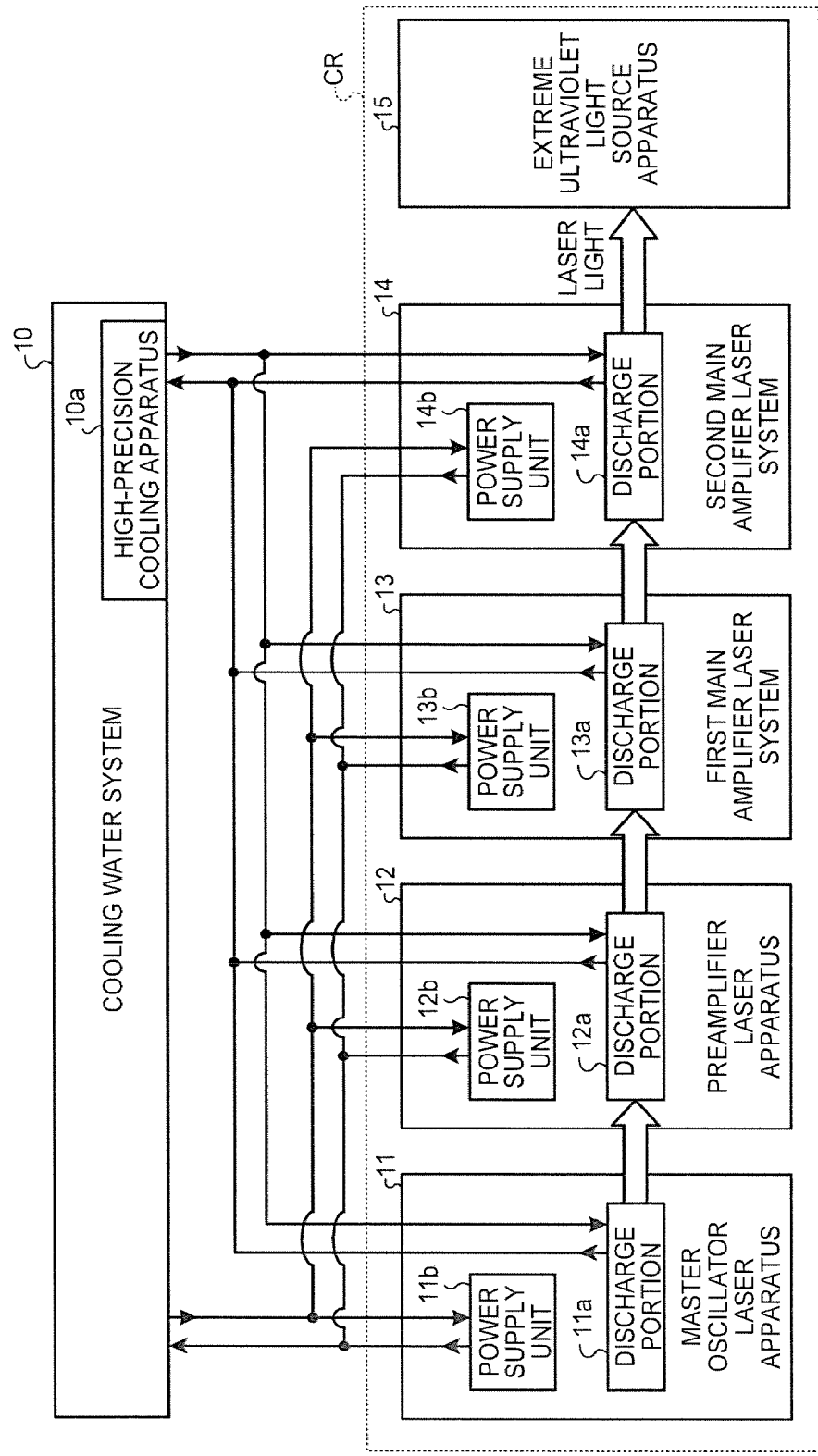
FIG. 13 is a schematic diagram showing a structure in that a temperature controller for a gas laser according to a fifth embodiment of the present disclosure is applied to a driver laser of an extreme ultraviolet light source apparatus.
Figure 14:
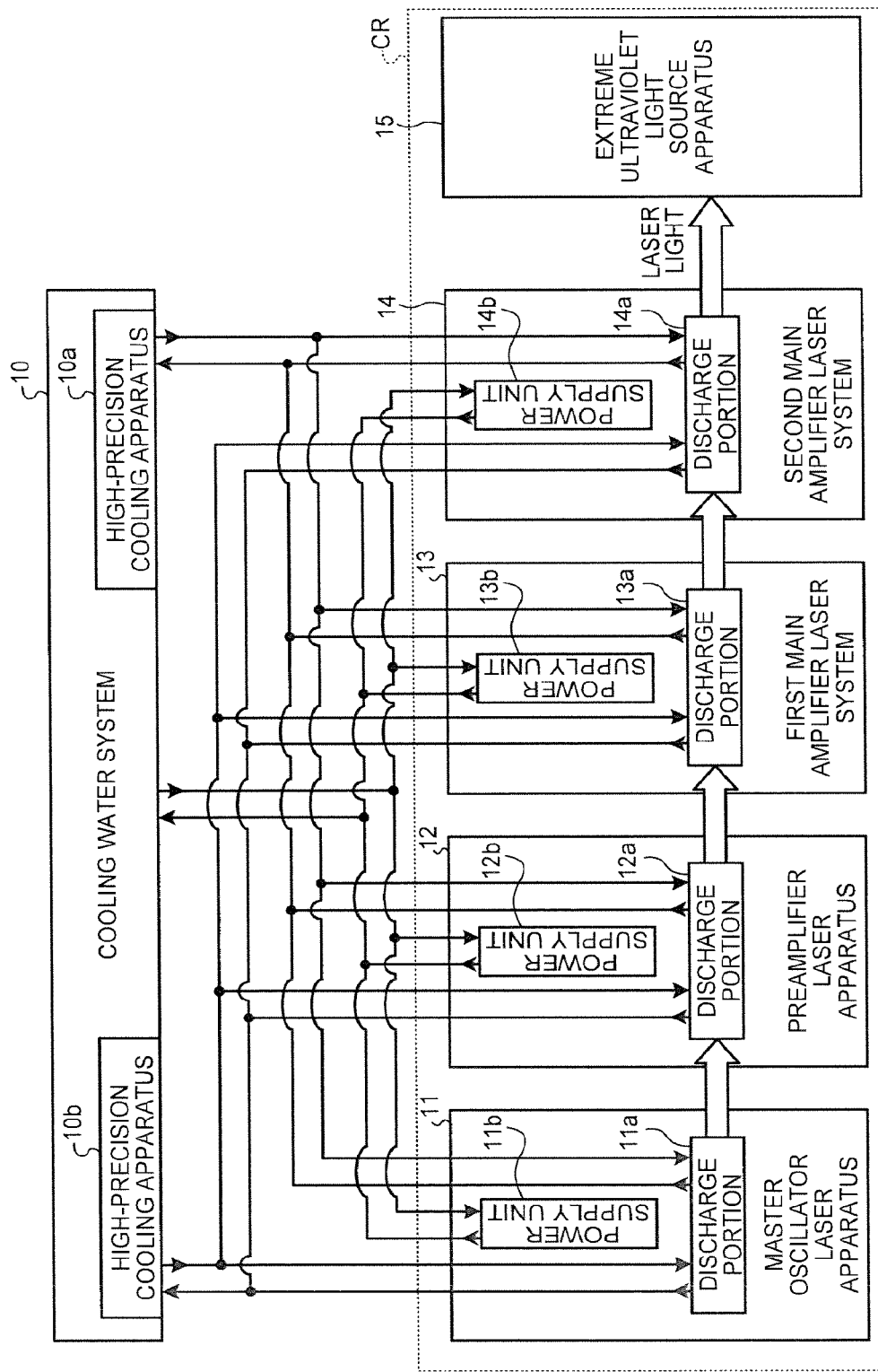
FIG. 14 is a schematic diagram showing a structure in that a temperature controller for a gas laser according to a first alternate example of the fifth embodiment is applied to the driver laser of the extreme ultraviolet light source apparatus.
Figure 15:
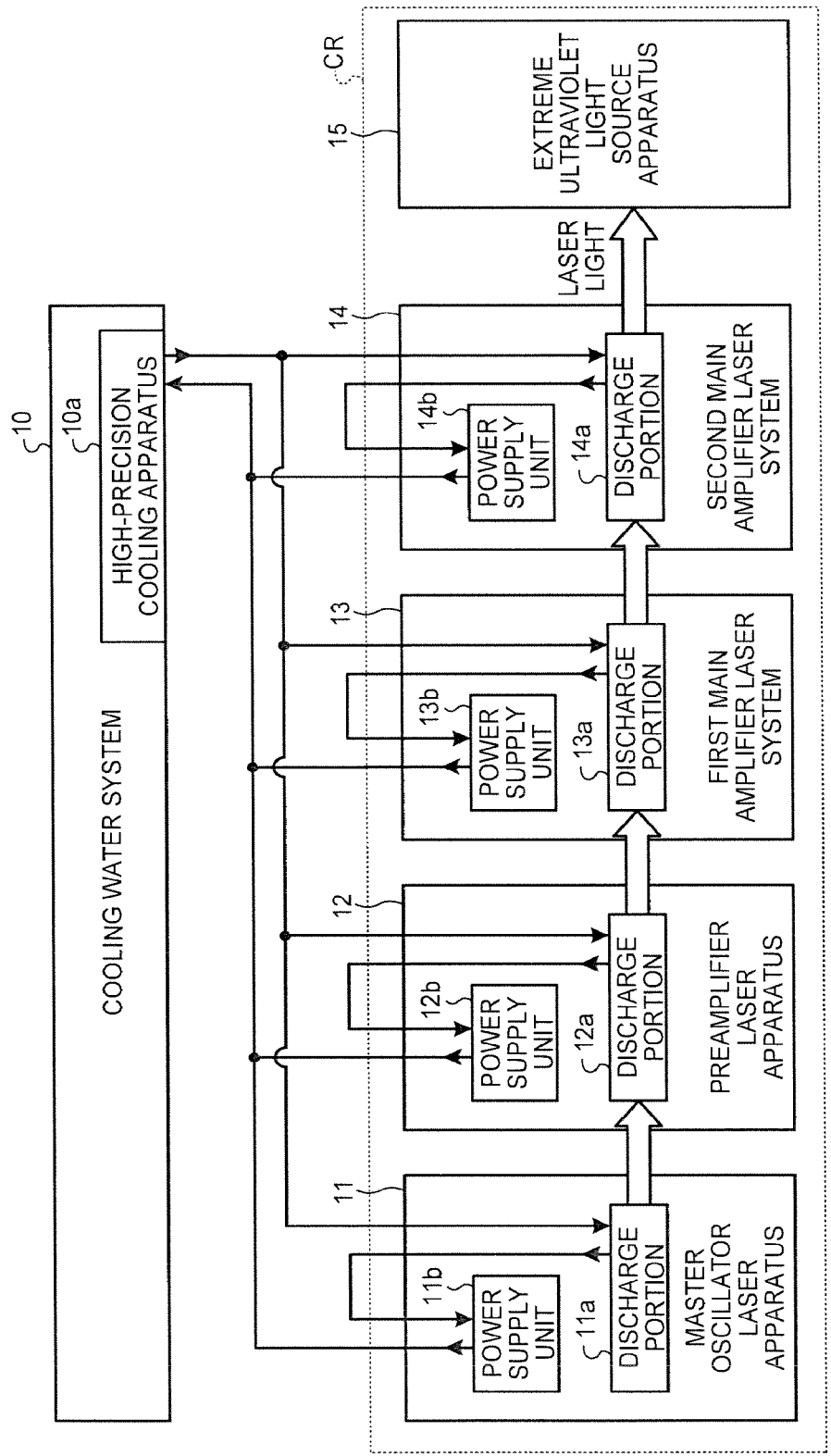
FIG. 15 is a schematic diagram showing a structure in that a temperature controller for a gas laser according to a second alternate example of the fifth embodiment is applied to the driver laser of the extreme ultraviolet light source apparatus.
Figure 16:
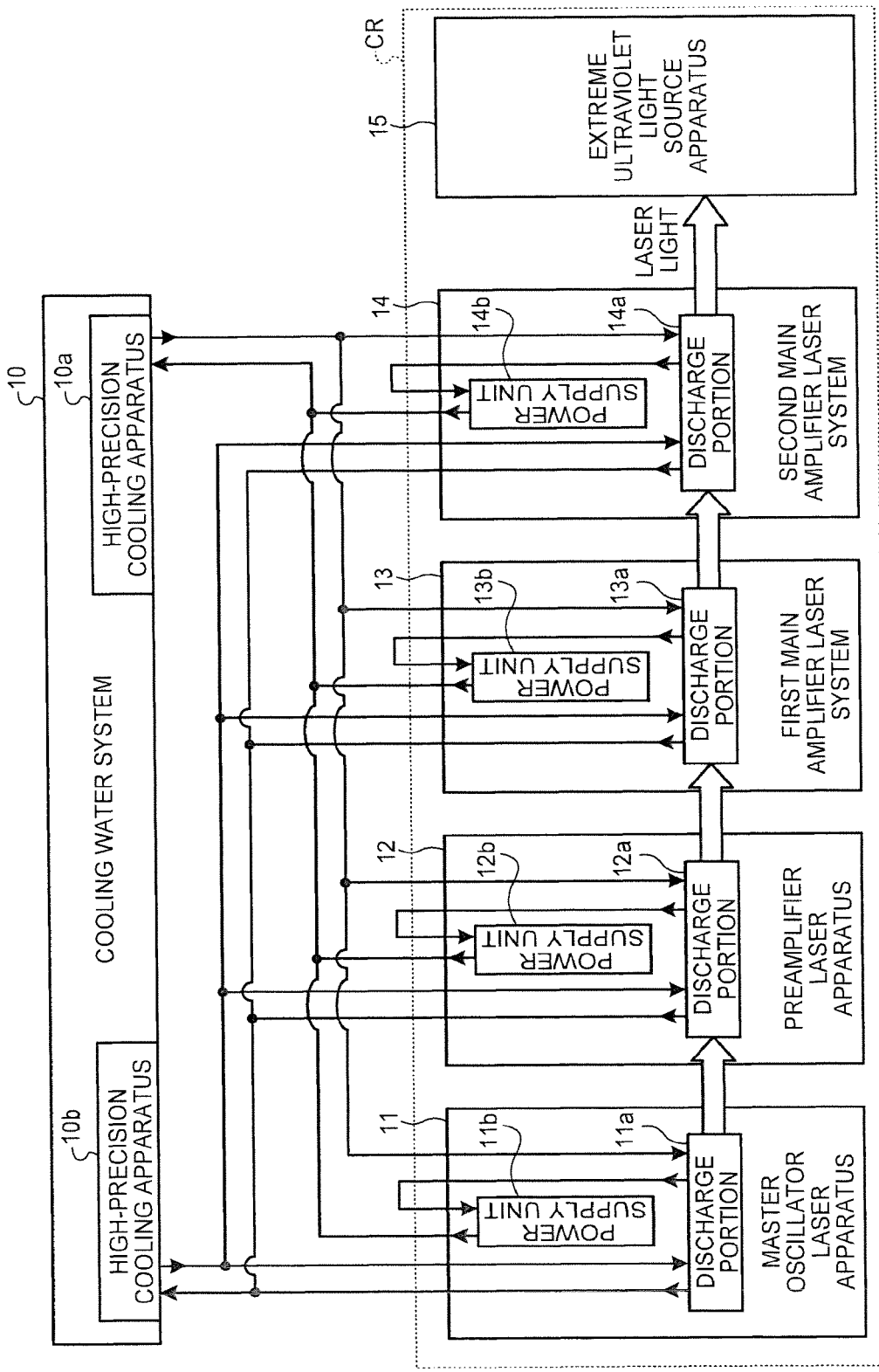
FIG. 16 is a schematic diagram showing a structure in that a temperature controller for a gas laser according to a third alternate example of the fifth embodiment is applied to the driver laser of the extreme ultraviolet light source apparatus.

For instance, in an example shown in FIG. 13, the chiller 32 shown in FIG. 7 is built in the cooling water system 10. Thereby, the function of the chiller 32 is realized as a high-precision cooling apparatus 10a. Moreover, in an example shown in FIG. 14, the chillers 31 and 32 shown in FIG. 8 are built in the cooling water system 10. Thereby, the functions of the chillers 31 and are realized as high-precision cooling apparatuses 10b and 10a. Furthermore, in an example shown in FIG. 15, the chiller 51 shown in FIG. 11 is built in the cooling system 10. Thereby, the function of the chiller 51 is realized as the high-precision cooling apparatus. Furthermore, in an example shown in FIG. 16, the chillers 51 and 61 shown in FIG. 12 are built in the cooling water system 10. Thereby, the functions of the chillers 51 and 61 are realized as the high-precision cooling apparatuses 10a and 10b. In addition, with respect to the power supply units 11b to 14b which do not require large cooling capacities, it is preferable that a chiller is not arranged and the cooling water of the cooling water system 10 is directly used without arranging a chiller, as shown in FIG. 13 or 14.

In the fifth embodiment, because the chiller(s) is built in the cooling water system 10 without being arranged individually, it is possible to easily and simply realize the chiller structure as a cooling apparatus while downsizing the whole apparatus.

Sixth Embodiment

Figure 17:
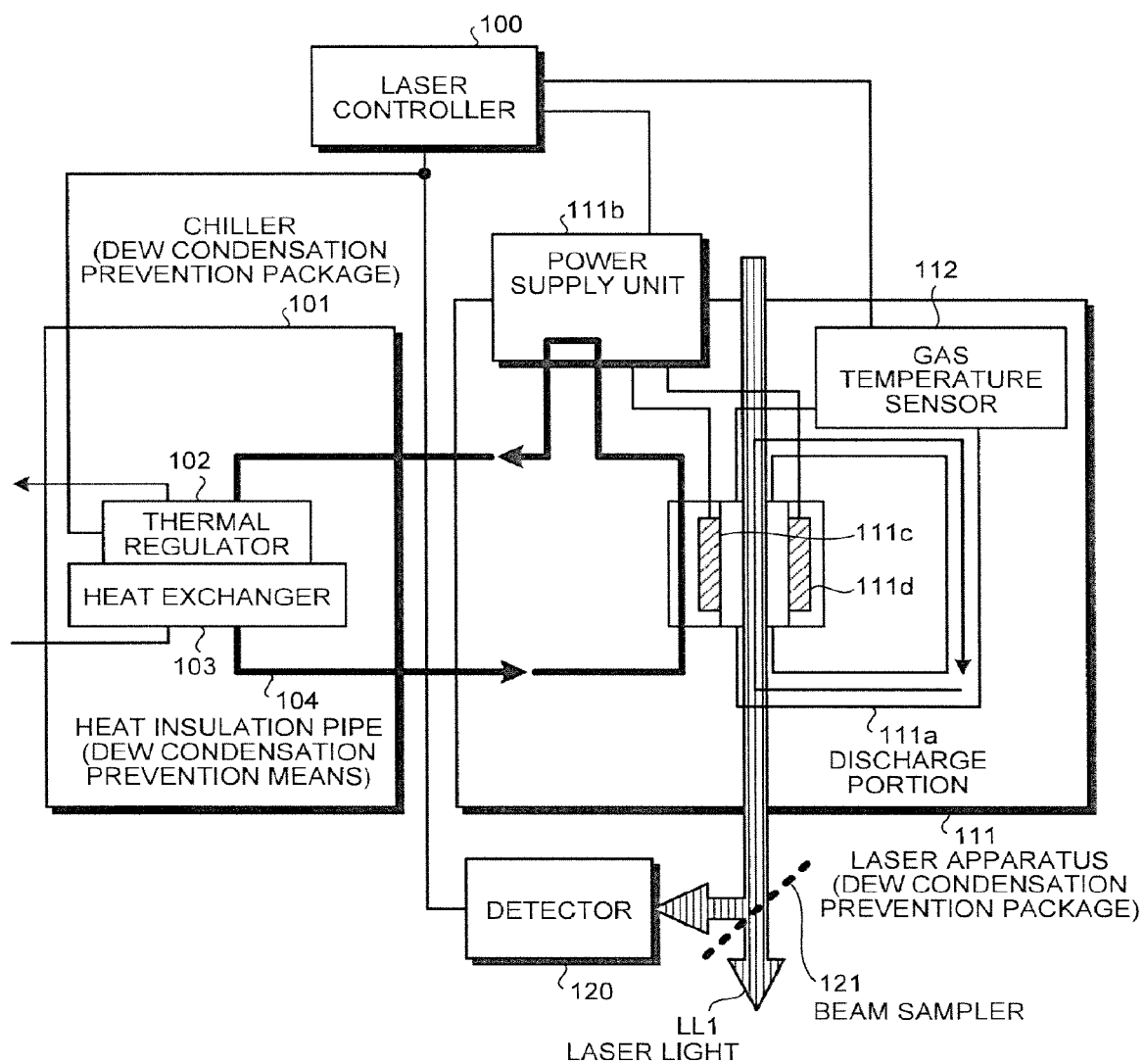
FIG. 17 is a schematic diagram showing an outline structure of a temperature controller for a gas laser according to a sixth embodiment of the present disclosure.

Next, a sixth embodiment of the present disclosure will be described in detail with reference to the accompanying drawings. FIG. 17 is a schematic diagram showing an outline structure of a temperature controller for a gas laser according to the sixth embodiment of the present disclosure. As shown in FIG. 17, the temperature controller for a gas laser according to the sixth embodiment has a laser apparatus 111 and a chiller 101 each of which has a dew condensation prevention purge. The laser apparatus 111 has a discharge portion 111a with discharge electrodes 111c and 111d facing to each other, a gas temperature sensor 112 detecting a temperature of a $CO_2$ gas filled in the discharge portion 111a, and a power supply unit 111b supplying voltages to the discharge electrodes 111c and 111d. On the other hand, the chiller 101 has a thermal regulator 102 and a heat exchanger 103. The laser apparatus 111 and the chiller 101 are connected by a heat insulation pipe 104 with a dew condensation prevention being applied.

Inside the heat insulation pipe 104 connecting from the chiller 101 to the laser apparatus 111, cooling water being cooled down by the heat exchanger 103 is flowing. The heat insulation pipe 104 is plumbed up to the discharge portion 111a of the laser apparatus 111. Accordingly, a $CO_2$ gas in the discharge portion 111a is cooled down by cooling water delivered from the chiller 101 via the heat insulation pipe 104. In order to effectively execute a gas cooling, in the discharge portion 111a, a radiator (not shown) in which cooling water is to pass through can be arranged on a gas passage. As in the first embodiment described above, for instance, drain cooling water after having cooled the discharge portion 111a returns to the chiller 101 by passing through the heat insulation pipe 104 which returns from the laser apparatus 111 to the chiller 101 via the power supply apparatus 111b. At this time, the power supply unit 111b is cooled down. After that, the drain cooling water having returned inside the chiller 101 is reused as the cooling water by the heat exchanger 103 arranged on the heat insulation pipe 104.

A laser light LL1 having been amplified by passing through the discharge portion 111a of the laser apparatus 111 is partially reflected by a beam sampler 121. Ahead of the reflection by the beam sampler 121, a detector 120 for detecting energy and/or power of a laser light is arranged. Thereby, an energy and/or power of the amplified laser light LL1 is detected.

A temperature of the $CO_2$ gas inside the discharge portion 111a detected by the gas temperature sensor 112, and energy and/or power of the amplified laser light LL1 detected by the detector 120 are inputted to a laser controller 100. The laser controller 100 controls the thermal regulator 102 and the power supply unit 111b based on the temperature received from the gas temperature sensor 112 and the energy and/or the power received from the detector 120. For instance, the laser controller 100 drives the power supply unit 111b so that the energy and/or power becomes desired energy and/or power, and operates the thermal regulator 102 so that gas temperature becomes constant. In such case, if it is impossible to obtain the desired energy and/or power with respect to some power output due to wear of electrode, degradation in the discharge portion, and so on, the laser controller 100 lowers the gas temperature by lowering the temperature of the cooling water using the thermal regulator 102 in order to obtain the desired energy and/or power. Such arrangement is possible because by increasing the small-signal gain by lowering the gas temperature as described in connection with FIG. 1, the amplified energy and/or power may be increased. Or, it is also possible to reduce the power consumption in the power supply unit 111b by decreasing the power supplied to the discharge portion 111a from the power supply unit 111b within a range in that the desired energy and/or power can be obtained while thermal regulator 102 previously arranged to operate under maximum capability. Among the structural elements of the multiple-stage laser amplification system such as this embodiment, a power consumption by the power supply unit is the largest. Therefore, decrease in the power consumption of the power supply unit may provide dramatic energy saving. As described above, the temperature of the cooling water supplied to the laser apparatus 111 and the output power of the power supply unit 111b are controlled so that the temperature of the $CO_2$ gas in the discharge portion 111a and the energy and/or power of the amplified laser light LL1 become desired values.

First Alternate Example of the Sixth Embodiment

Figure 18:
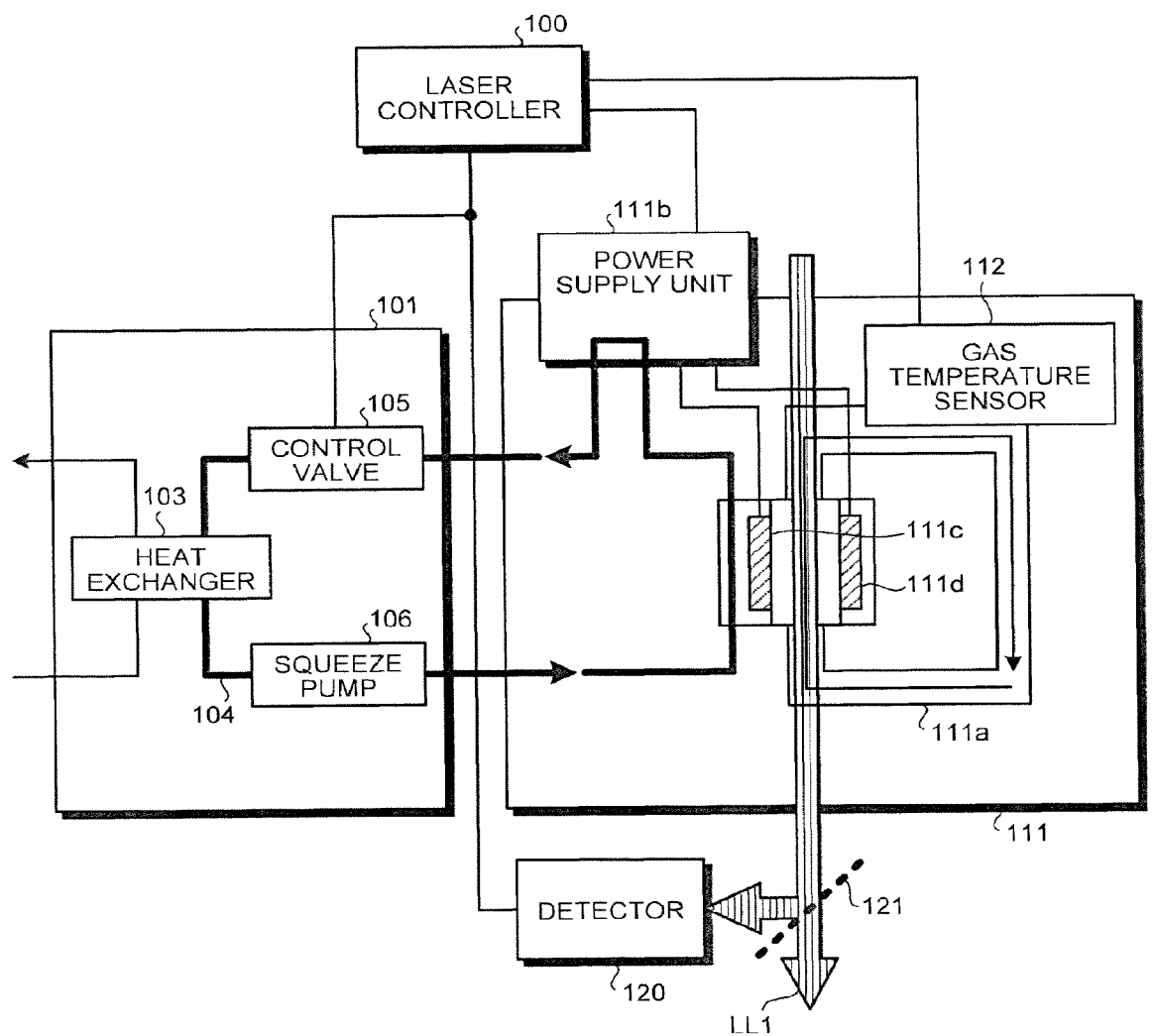
FIG. 18 is a schematic diagram showing an outline structure of a temperature controller for a gas laser according to a first alternate example of the sixth embodiment.
Figure 19:
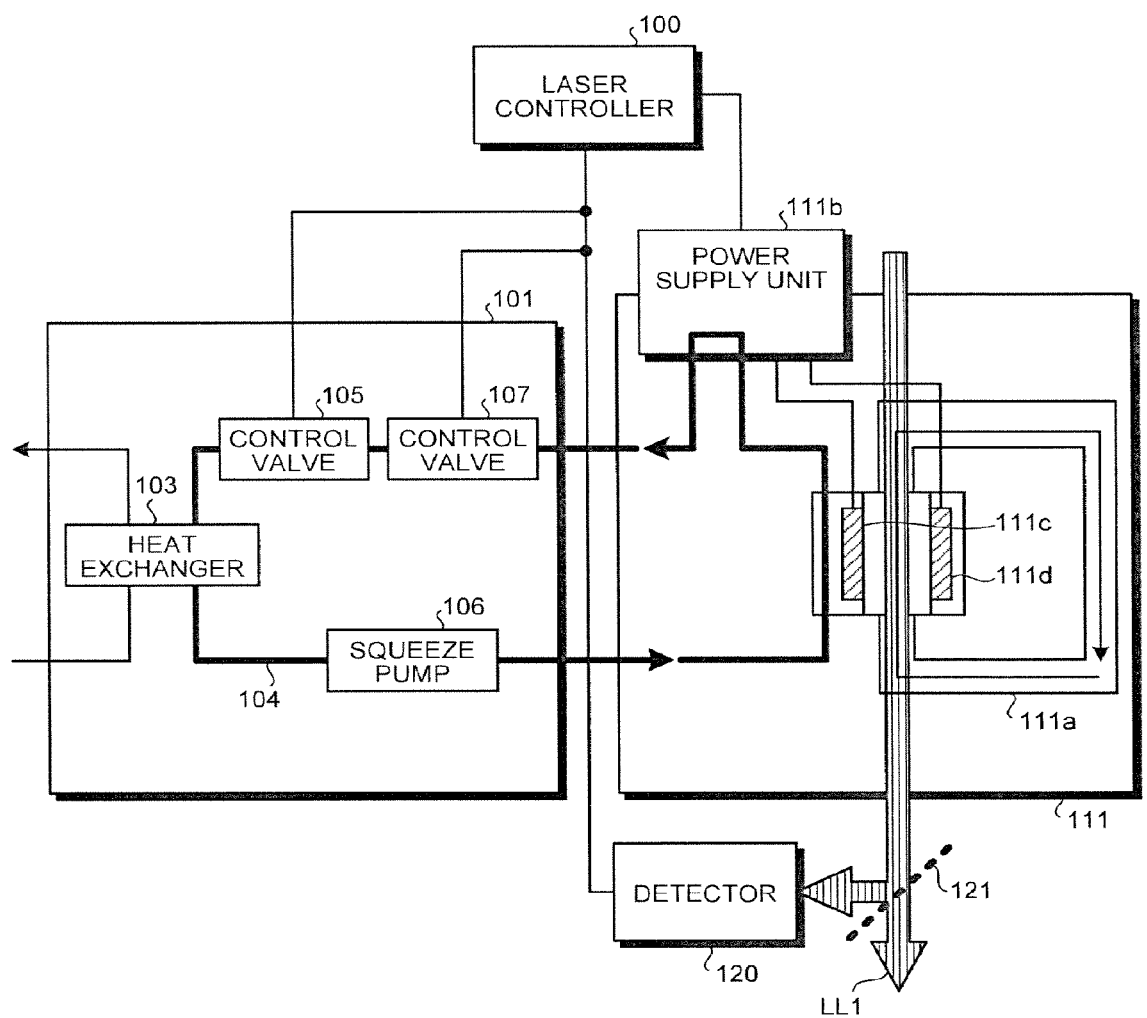
FIG. 19 is a schematic diagram showing an outline structure of a temperature controller for a gas laser according to a second alternate example of the sixth embodiment.

In the above-described sixth embodiment, the case in that the temperature of the cooling water supplied from the chiller 101 to the laser apparatus 111 and the output power of the power supply unit 111b are controlled based on the temperature of the $CO_2$ gas in the discharge portion 111a and the energy and/or power of the amplified laser light LL1 is shown as an example. However, such case in not definite. As shown in FIG. 19, for instance, it is also possible to arrange a squeeze pump 106 on the heat insulation pipe 104 extending from the laser apparatus 111 to the chiller 101 while arranging a control valve 105 on the heat insulation pipe 104 extending from the chiller 101 to the laser apparatus 111. FIG. 18 is a schematic diagram showing an outline structure of a temperature controller for a gas laser according to a first alternate example of the sixth embodiment. In the structure shown in FIG. 18, to the laser controller 100, the energy and/or power of the amplified laser light LL1 detected by the detector 120 is inputted. The laser controller 100 controls the control valve 105 and the squeeze pump 106 so that the inputted energy and/or power become desired values. Thereby, a flow rate of the cooling water flowing from the chiller 101 to the laser apparatus 111 is controlled, and as a result, the temperature of the $CO_2$ gas in the discharge portion 111a is adjusted.

Second Alternate Example of the Sixth Embodiment

As shown in FIG. 19, for instance, in the structure shown in FIG. 18, it is possible to arrange a flow sensor 107 for detecting a flow rate of the cooling water flowing from the chiller 101 to the laser apparatus 111 on the heat insulation pipe 104 extending from the chiller 101 to the laser apparatus 111. FIG. 19 is a schematic diagram showing an outline structure of a temperature controller for a gas laser according to a second alternate example of the sixth embodiment. In a structure shown in FIG. 19, to the laser controller 100, the energy and/or power of the amplified laser light LL1 detected by the detector 120 and a flow rate of the cooling water detected by the flow sensor 107 are inputted. The laser controller 100 controls the control valve 105 based on the inputted energy and/or power of the amplified laser light LL1 and the inputted flow rate of the cooling water. Thereby, the flow rate of the cooling water to be supplied to the laser apparatus 111 is controlled so that the energy and/or power of the amplified laser light LL1 and flow rate of the cooling water flowing into the laser apparatus 111 from the chiller 101 become desired values.

Seventh Embodiment

Figure 20:
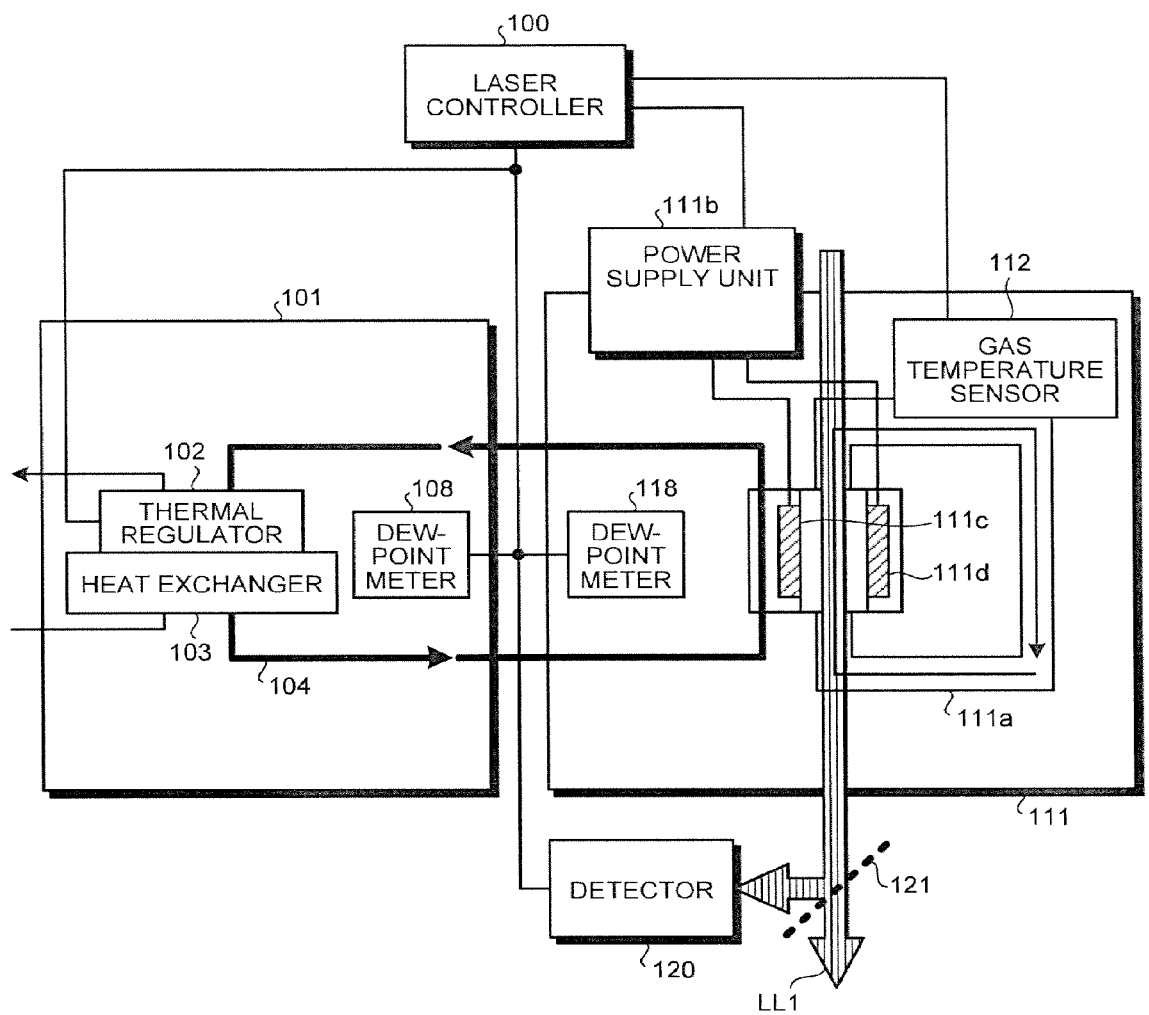
FIG. 20 is a schematic diagram showing an outline structure of a temperature controller for a gas laser according to a seventh embodiment of the present disclosure.

Next, a seventh embodiment of the present disclosure will be described in detail with reference to the accompanying drawings. FIG. 20 is a schematic diagram showing an outline structure of a temperature controller for a gas laser according to the seventh embodiment of the present disclosure. As shown in FIG. 20, a temperature controller for a gas laser according to the seventh embodiment has the same structure as the temperature controller for a gas laser shown in FIG. 17, but further has dew-point meters 108 and 118 inside the chiller 101 and the laser apparatus 111, respectively. In the inside of the chiller 101 and the laser apparatus 111, a dew condensation prevent purge need not necessarily be executed.

Temperatures of dew points detected by the dew point meters 108 and 118 are inputted to the laser controller 100. To the laser controller 100, the temperature of the $CO_2$ gas inside the discharge portion 111a detected by the gas temperature sensor 112 and the energy and/or power of the amplified laser light LL1 as detected by the detector 120 are also inputted. The laser controller 100 compares the lower temperature of the dew point among the temperatures of dew point detected by the dew point meters 108 and 118 and the temperature of the $CO_2$ gas inside the discharge portion 111a, and controls the thermal regulator 102 so that the temperature of the CO2 gas does not become lower than the lower temperature of the dew point. The laser controller 100 also controls the thermal regulator 102 based on the energy and/or power of the amplified laser light LL1. Thereby, the temperature of the cooling water to be supplied to the laser apparatus 111 is controlled so that the temperature of the $CO_2$ gas inside the discharge portion 111a and the energy and/or power of the amplified laser light LL1 become the desired values or greater while preventing dew condensation occurring inside the chiller 101 and the laser apparatus 111. In this embodiment, although the dew meter is being used, such arrangement is not definite. It is appropriate as long as occurrence of dew condensation can be at least detected, and therefore, a dulling sensor arranged at a portion to be at the lowest temperature in the laser apparatus and the chiller can be used as an alternate. Moreover, a combination of a temperature sensor for detecting an air temperature and a sensor for detecting a water vapor pressure in the air such as hygrometer, or the like, can also be used. The laser controller calculates the temperature of the dew point based on the detected values of these sensors.

In each of the first to seventh embodiments described above, the cooling system such as the chiller is explained as the temperature controller for a gas laser. However, such arrangements are not definite while a structure that temperature-controls using a heater can be applied to the temperature controller for a gas laser.

Furthermore, although the cooling water has been explained as an example, the cooling agent is not limited to the cooling water. Moreover, it can be a heating agent. Moreover, the agent could be fluid, but not limited to liquid while gaseous body can be accepted.

Furthermore, in the first to seventh embodiments described above, although the driver lasers used for the extreme ultraviolet light source apparatus are explained as examples, such arrangements are not definite. A driver laser for processing can be applied, and furthermore, an apparatus with a structure that temperature-controlled targets with different degree of precision are included in a plurality of temperature-controlled apparatuses can be applied.

As described above, according to the embodiments of the present disclosure, a first temperature control portion generates a cooling agent or a heating agent for adjusting a temperature of each first temperature-controlled portion, a temperature control is executed by flowing the cooling agent or the heating agent into each first temperature-controlled portion via a first pipe which connects the first temperature control portion and each first temperature-controlled portion in parallel, a second temperature control portion generates a cooling agent or a heating agent for adjusting a temperature of each second temperature-controlled portion, and a temperature control is executed by flowing the cooling agent or the heating agent into each second temperature-controlled portion via a second pipe which connects the second temperature control portion and each second temperature-controlled portion. By such structure, it is possible to execute a temperature control only using a minimum cooling capacity, and therefore, it is possible to enhance the apparatus downsizing while enhancing the energy saving.

Additional advantages and modifications will readily occur to those skilled in the art. Therefore, the disclosure in its broader aspects is not limited to the specific details, representative embodiments and alternate examples shown and described herein. Accordingly, various modifications may be made without departing from the spirit or scope of the general inventive concept as defined by the appended claims and their equivalents. Furthermore, the above-mentioned embodiments and the alternate examples can be arbitrarily combined with one another.

What is claimed is:

1. A temperature controller for a gas laser which controls temperatures of a plurality of temperature-controlled apparatuses including first temperature-controlled portions each of which requires a high-precision temperature-control and second temperature-controlled portions each of which requires a low-precision temperature-control as compared with the first temperature-controlled portions and allowing a temperature-control with a low or high temperature as compared with the first temperature-controlled portions, the temperature controller for a gas laser comprising:
    a first piping system configured to connect the first temperature-controlled portions in parallel with each other;
    a second piping system configured to connect the second temperature-controlled portions in parallel with each other; and
    a temperature control portion located on the first piping system and configured to cool or heat an existing cooling water provided from an upstream cooling system for adjusting a temperature of the first temperature-controlled portions,
    the temperature-controlled existing cooling water cooled or heated by the temperature control portion flowing through each first temperature-controlled portion by passing through the first piping system, and
    the existing cooling water provided from the upstream cooling system being directly provided to the second piping system.

2. The temperature controller for a gas laser according to claim 1, further comprising:
    a flow controller adjusting a flow rate of the existing cooling water flowing with respect to each first temperature-controlled portion and/or each second temperature-controlled portion.

3. The temperature controller for a gas laser according to claim 1, wherein
    diameters of pipes with respect to the first temperature-controlled portions and/or the second temperature-controlled portions are different depending on temperature-control capacities of the first temperature-controlled portions and/or the second temperature-controlled portions.

* * * * *